United States Patent
Nakamura et al.

(10) Patent No.: US 11,884,816 B2
(45) Date of Patent: Jan. 30, 2024

(54) RESIN PARTICLE

(71) Applicant: FUJIFILM BUSINESS INNOVATION CORP., Tokyo (JP)

(72) Inventors: Yukiaki Nakamura, Kanagawa (JP); Masaru Takahashi, Kanagawa (JP); Ryutaro Kembo, Kanagawa (JP)

(73) Assignee: FUJIFILM BUSINESS INNOVATION CORP., Tokyo (JP)

( * ) Notice: Subject to any disclaimer, the term of this patent is extended or adjusted under 35 U.S.C. 154(b) by 451 days.

(21) Appl. No.: 16/935,435

(22) Filed: Jul. 22, 2020

(65) Prior Publication Data
US 2021/0253845 A1 Aug. 19, 2021

(30) Foreign Application Priority Data
Feb. 17, 2020 (JP) .................................. 2020-024713

(51) Int. Cl.
| C08L 67/00 | (2006.01) |
| C08L 75/04 | (2006.01) |
| C08K 5/00 | (2006.01) |
| G03G 9/09 | (2006.01) |
| G03G 9/08 | (2006.01) |
| G03G 9/087 | (2006.01) |

(52) U.S. Cl.
CPC ............... *C08L 67/00* (2013.01); *C08L 75/04* (2013.01); *C08K 5/0041* (2013.01)

(58) Field of Classification Search
None
See application file for complete search history.

(56) References Cited

U.S. PATENT DOCUMENTS

| 2010/0075241 A1 | 3/2010 | Kazmaier et al. |
| 2010/0173239 A1* | 7/2010 | Iftime .................. G03G 9/0821 430/107.1 |
| 2011/0151367 A1* | 6/2011 | Haruki ................ G03G 9/0806 430/105 |
| 2012/0237865 A1 | 9/2012 | Kazmaier et al. |
| 2014/0272339 A1 | 9/2014 | Tyagi et al. |
| 2015/0192873 A1* | 7/2015 | Fujibayashi ......... G03G 9/0902 430/109.1 |

FOREIGN PATENT DOCUMENTS

| JP | S54-5733 A | 1/1979 |
| JP | S59-023017 U | 2/1984 |
| JP | H11-19472 A | 1/1999 |
| JP | H11-119742 A | 4/1999 |
| JP | 2010-072643 A | 4/2010 |
| JP | 2017-3818 A | 1/2017 |
| JP | 2017-1102413 A | 6/2017 |

OTHER PUBLICATIONS

Feb. 12, 2021 Extended European Search Report issued in European Patent Application 20191482.7.
Nov. 28, 2023 Office Action issued in Japanese Patent Application 2020-024713.

* cited by examiner

*Primary Examiner* — Randy P Gulakowski
*Assistant Examiner* — Ha S Nguyen
(74) *Attorney, Agent, or Firm* — Oliff PLC

(57) ABSTRACT

A resin particle includes a binder resin; a fluorescent colorant A; and a colorant B other than the fluorescent colorant A, in which the resin particle includes a region RA in which a content of the fluorescent colorant A is larger than a content of the colorant B and a region RB in which a content of the colorant B is larger than a content of the fluorescent colorant A.

13 Claims, 5 Drawing Sheets

RESIN PARTICLE

CROSS-REFERENCE TO RELATED APPLICATIONS

This application is based on and claims priority under 35 USC 119 from Japanese Patent Application No. 2020-024713 filed on Feb. 17, 2020.

BACKGROUND

Technical Field

The present invention relates to a resin particle.

Related Art

A resin particle has various applications, one of which is a toner for electrophotography. As a toner in the related art, those described in Patent Literatures 1 to 3 are known.

Patent Literature 1 discloses a toner containing a binder resin and a colorant, in which the colorant contains a color pigment and a fluorescent dye, and when contents in a mass basis of the color pigment and the fluorescent dye in the toner are $W_G$ and $W_F$, respectively, the $W_G$ and $W_F$ satisfy the following expression (1):

$$W_G \times 0.5 > W_F > W_G \times 0.025 \tag{1}$$

and, when an absorption peak wavelength of the color pigment is $P_G$ and an emission peak wavelength of the fluorescent dye is $P_F$, the $P_G$ and $P_F$ satisfy the following expression (2):

$$P_G < P_F \tag{2}.$$

Patent Literature 2 discloses a negatively charged magenta toner for electrophotography, which is obtained by kneading a magenta colorant, obtained by heat-kneading a Rhodamine dye and a high acid value resin, with a binder resin and other toner materials, if necessary.

Patent Literature 3 discloses a color toner containing a binder resin and a heat-treated mixture of a basic dye and a resin having an acid value of 5 to 120 as a colorant.

Patent Literature 1: JP-A-2017-3818
Patent Literature 2: JP-A-H11-119742
Patent Literature 3: JP-A-S54-5733

SUMMARY

Aspects of non-limiting embodiments of the present disclosure related to a resin particle containing a binder resin, a fluorescent colorant A, and a colorant B other than the fluorescent colorant A, in which the obtained image has higher fluorescence intensity as compared with a case where there is no region RA in which the content of the fluorescent colorant A is larger than that of the colorant B nor region RB in which the content of the colorant B is larger than that of the fluorescent colorant A.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided a resin particle containing: a binder resin; a fluorescent colorant A; and a colorant B other than the fluorescent colorant A, in which the resin particle includes a region RA in which a content of the fluorescent colorant A is larger than a content of the colorant B and a region RB in which a content of the colorant B is larger than a content of the fluorescent colorant A.

BRIEF DESCRIPTION OF THE DRAWINGS

Exemplary embodiment(s) of the present invention will be described in detail based on the following figures, wherein.

Figure 1:
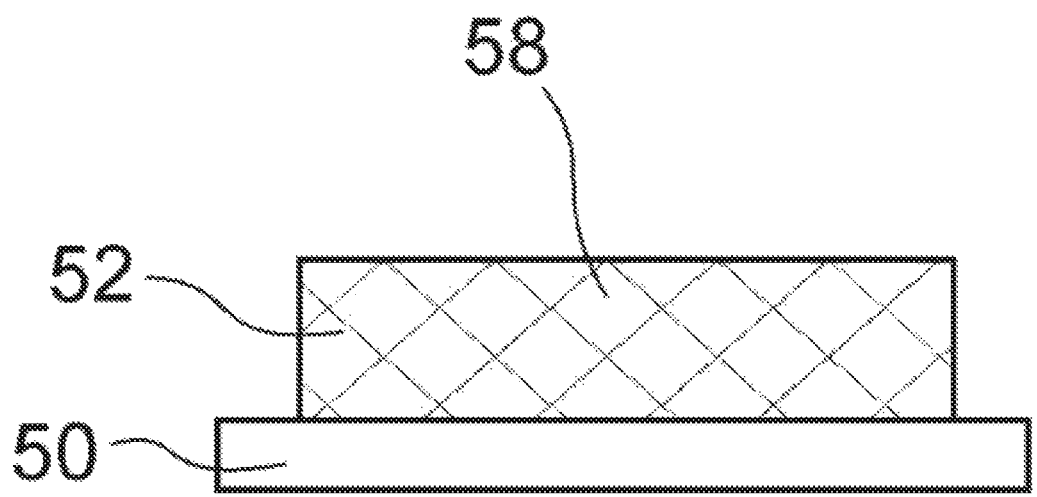
FIG. 1 is a schematic sectional view illustrating an example of a toner image in the related art.

Reference numbers and signs in FIG. 1 to FIG. 5 are described below.

1Y, 1M, 1C, 1K: photoconductor (an example of image carrier)
2Y, 2M, 2C, 2K: charging roller (an example of charging unit)
3: exposure device (an example of electrostatic charge image forming unit)
3Y, 3M, 3C, 3K: laser beam
4Y, 4M, 4C, 4K: developing device (an example of developing unit)
5Y, 5M, 5C, 5K: primary transfer roller (an example of primary transfer unit)
6Y, 6M, 6C, 6K: photoconductor cleaning device (an example of image carrier cleaning unit)
8Y, 8M, 8C, 8K: toner cartridge
10Y, 10M, 10C, 10K: image forming unit
20: intermediate transfer belt (an example of intermediate transfer body)
22: drive roller
24: support roller
26: secondary transfer roller (an example of secondary transfer unit)
28: fixing device (an example of fixing unit)
30: intermediate transfer belt cleaning device (an example of intermediate transfer body cleaning unit)
P: recording paper (an example of recording medium)
50: recording medium
52: toner image
54: region RA
56: region RB
58: color-mixing region
107: photoconductor (an example of image carrier)
108: charging roller (an example of charging unit)
109: exposure device (an example of electrostatic charge image forming unit)
111: developing device (an example of developing unit)
112: transfer device (an example of transfer unit)
113: photoconductor cleaning device (an example of image carrier cleaning unit)
115: fixing device (an example of fixing unit)
116: mounting rail
117: housing

118: opening for exposure
200: process cartridge
300: recording paper (an example of recording medium)
A: red-orange
B: green
C: red
D: orange
E: yellow
F: yellow-orange
G: pink
H: blue
I: white
J: general color pigment (representative example)

DETAILED DESCRIPTION

In the present description, in a case of referring to the amount of each component in a composition, when there are a plurality of substances corresponding to each component in the composition, unless otherwise specified, it refers to the total amount of the plurality of substances present in the composition.

Hereinafter, an exemplary embodiment as an example of the present invention will be described.

<Resin Particle>

The resin particle according to the exemplary embodiment contains a binder resin, a fluorescent colorant A, and a colorant B other than the fluorescent colorant A, in which the resin particle includes a region RA in which a content of the fluorescent colorant A is larger than a content of the colorant B and a region RB in which a content of the colorant B is larger than a content of the fluorescent colorant A.

In recent years, in digital printing, printers for commercial printing, publishing, and paper container packaging fields and models appealing for special color toner have been released from various companies. In the same manner as a normal special color, the fluorescent color is often selected from various colors from a strong fluorescent color to a faint fluorescent color by using a color sample book or a color chip such as Neons Guide manufactured by PANTONE LLC, DIC color guide manufactured by DIC CORPORATION, and COLOR FINDER manufactured by TOYO INK CO., LTD. However, when an attempt is made to reproduce a fluorescent color using a toner whose tint is adjusted by containing a fluorescent colorant and a fluorescent pigment, the fluorescence intensity may be lower than a fluorescence intensity expected from the amount of the fluorescent pigment.

As a result of the intensive study of the present inventors, it is found that, in the resin particle, when the fluorescent colorant A and the colorant B other than the fluorescent colorant A are mixed in a nearly uniform state, the colorant B absorbs the light necessary for the fluorescence (excitation) of the fluorescent colorant A, and therefore, the fluorescence intensity is lowered.

With the above configuration, the resin particle according to the exemplary embodiment has high fluorescence intensity in the obtained image. The reason is not clear, but it is presumed that the reason is as follows.

When the resin particle includes the region RA in which the content of the fluorescent colorant A is larger than that of the colorant B and the region RB in which the content of the colorant B is larger than that of the fluorescent colorant A, the light may pass through or be reflected only in a portion where the fluorescent colorant A is present in a large amount. Therefore, a decrease in fluorescence intensity of the fluorescent colorant A due to the colorant B is prevented, and the fluorescence intensity of the obtained image is high.

Hereinafter, the resin particle according to the exemplary embodiment will be described in detail.

The resin particle contains a binder resin, a fluorescent colorant A, and a colorant B other than the fluorescent colorant A, and, if necessary, a release agent and other additives. The resin particle preferably contains a binder resin, a fluorescent colorant A, a colorant B other than the fluorescent colorant A, and a release agent.

In addition, the resin particle includes a region RA in which the content of the fluorescent colorant A is larger than that of the colorant B and a region RB in which the content of the colorant B is larger than that of the fluorescent colorant A.

FIG. 1 is a schematic sectional view illustrating an example of a toner image in the related art.

In the toner image in the related art formed using a toner containing a fluorescent colorant and a colorant other than the fluorescent colorant, a toner image 52 formed on a recording medium 50 is a color-mixing region 58 in which the fluorescent colorant and the colorant other than the fluorescent colorant are mixed in a nearly uniform state, and the absorption of the colorant greatly influences the fluorescence of the fluorescent colorant.

Figure 2:
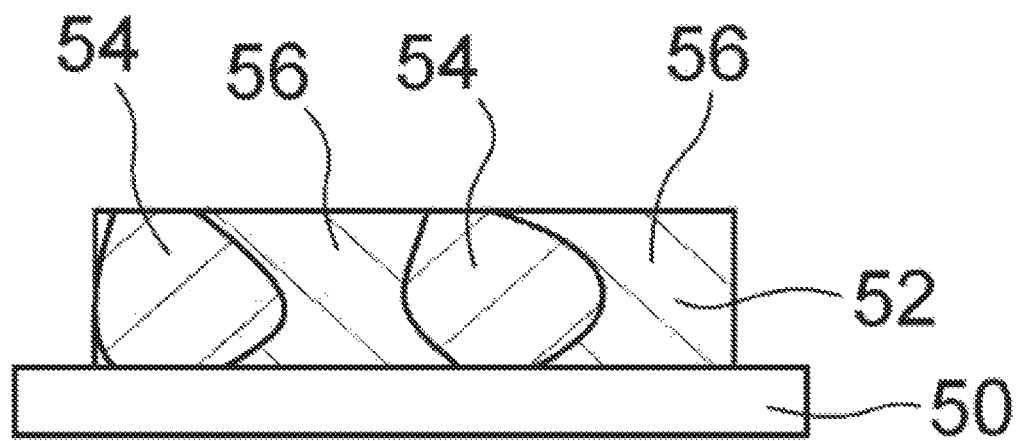
FIG. 2 is a schematic sectional view illustrating an example of a toner image in which a resin particle according to the exemplary embodiment is used as an electrostatic charge image developing toner.

On the other hand, FIG. 2 is a schematic sectional view illustrating an example of a toner image in which the resin particle according to the exemplary embodiment is used as an electrostatic charge image developing toner.

The toner image 52 formed on the recording medium 50, which is a toner image formed using the resin particle according to the exemplary embodiment as the electrostatic charge image developing toner, includes a region 54 (region RA) in which the content of the fluorescent colorant A is larger than that of the colorant B, and a region 56 (region RB) in which the content of the colorant B is larger than that of the fluorescent colorant A. Particularly in the portion of the region 54, that is region RA, the influence of the absorption of the colorant B on the fluorescence of the fluorescent colorant A is small, and the overall fluorescence intensity of the obtained image is high. As a result, the overall vividness, that is saturation, is also improved.

From the viewpoint of the fluorescence intensity, the region RA is preferably a region in which the content of the fluorescent colorant A is 80 mass % or more based on the total mass of the colorants contained, more preferably a region in which the content of the fluorescent colorant A is 90 mass % or more based on the total mass of the colorants contained, and particularly preferably a region containing only the fluorescent colorant A as the colorant contained therein.

In addition, from the viewpoint of the fluorescence intensity, the region RB is preferably a region in which the content of the colorant B is 80 mass % or more based on the total mass of the colorants contained, more preferably a region in which the content of the colorant B is 90 mass % or more based on the total mass of the colorants contained, and particularly preferably a region containing only the colorant B as the colorant contained therein.

From the viewpoint of the fluorescence intensity, among the total mass of the fluorescent colorant A contained in the resin particle, it is preferable that 80 mass % or more is contained in the region RA, and it is more preferable that 90 mass % or more is contained in the region RA.

In addition, from the viewpoint of the fluorescence intensity, among the total mass of the colorant B contained in the resin particle, it is preferable that 80 mass % or more is contained in the region RB, and it is more preferable that 90 mass % or more is contained in the region RB.

Further, from the viewpoint of the fluorescence intensity, it is preferable that 80 mass % or more of the total mass of the fluorescent colorant A contained in the resin particle is contained in the region RA and 80 mass % or more of the total mass of the colorant B contained in the resin particle is contained in the region RB, and it is more preferable that 90 mass % or more of the total mass of the fluorescent colorant A contained in the resin particle is contained in the region RA and 90 mass % or more of the total mass of the colorant B contained in the resin particle is contained in the region RB.

In the resin particle, the structure formed by the region RA and the region RB is not particularly limited, and examples thereof include a sea-island structure, an interpenetrating network structure, and a core-shell structure.

Among these, in the resin particle, the region RA and the region RB preferably form a sea-island structure or an interpenetrating network structure, and more preferably a sea-island structure, from the viewpoint of the fluorescence intensity.

From the viewpoint of the fluorescence intensity, it is particularly preferable that the region RA forms an island structure and the region RB forms a sea structure as the sea-island structure.

From the viewpoint of the fluorescence intensity, the value of the ratio VI/VT of the volume average particle diameter VI of the island structure in the sea-island structure to the volume average particle diameter VT of the resin particle is preferably 0.15 or more and 0.80 or less, more preferably 0.20 or more and 0.75 or less, and particularly preferably 0.30 or more and 0.65 or less.

The resin particle preferably contains at least resin particle having two or more sea structures.

The volume average particle diameter of the island structure in the sea-island structure is not particularly limited, and is preferably 1 μm or more and less than the volume average particle diameter of the resin particle, more preferably 2 μm or more and less than the volume average particle diameter of the resin particle, still more preferably 2.5 μm or more and less than the volume average particle diameter of the resin particle, and particularly preferably 2.5 μm or more and (the volume average particle diameter of the resin particle—1 μm) or less.

As for the method for confirming the sea-island structure or the like in the resin particle, the following method is performed.

A sample is prepared by embedding the resin particle in a resin. A section is prepared from the prepared sample using a microtome. The prepared section is subjected to a surface smoothing (CP) and etching (IM) treatment with an ion milling device RES101 manufactured by Leica. A cross-sectional image of the resin particle in the treated section is observed with an optical microscope, and the sea-island structure or the like is confirmed by the color difference between the region RA and the region RB.

In addition, the volume average particle diameter VI of the island structure in the sea-island structure of the resin particle is obtained by a method same as the method for confirming the sea-island structure or the like. The cross sections of 50 or more resin particles are observed, the circle-equivalent diameter of the island structure in the sea-island structure is measured, and 50 island structures having a large circle-equivalent diameter are averaged to obtain the volume average particle diameter VI of the island structure.

In the cross section of the resin particle, the ratio of the region RA is preferably 10 area % or more and 90 area % or less, and more preferably 20 area % or more and 80 area % or less.

As described above, a method of measuring the ratio of the region RA is performed by observing the cross sections of 50 or more resin particles to obtain the average value.

—Fluorescent Colorant A—

The fluorescent colorant A may be a colorant that exhibits fluorescence, and is preferably a colorant that exhibits fluorescence in the visible light region (wavelength 380 nm or more and 760 nm or less). The light that excites the fluorescent colorant A is not particularly limited, and preferably includes at least visible light or ultraviolet light, and more preferably includes at least ultraviolet light.

Further, the fluorescent colorant A may be a fluorescent pigment or a fluorescent dye, and is preferably a fluorescent dye.

In the exemplary embodiment, the "pigment" is a colorant having a solubility of less than 0.1 g in 100 g of water at 23° C. and a solubility of less than 0.1 g in 100 g of cyclohexanone at 23° C., and the "dye" is a colorant having a solubility of 0.1 g or more in 100 g of water at 23° C. or in 100 g of cyclohexanone at 23° C.

The color of the fluorescent colorant A is not particularly limited and may be appropriately selected as desired.

Examples of the fluorescent colorant A include a fluorescent pink colorant, a fluorescent red colorant, a fluorescent orange colorant, a fluorescent yellow colorant, a fluorescent green colorant, and a fluorescent purple colorant.

Among these, a fluorescent pink colorant, a fluorescent red colorant, a fluorescent orange colorant, a fluorescent yellow colorant, or a fluorescent green colorant is preferred, a fluorescent pink colorant, a fluorescent yellow colorant, or a fluorescent green colorant is more preferred, and a fluorescent pink colorant is particularly preferred.

The resin particle according to the exemplary embodiment is preferably a fluorescent color resin particle, more preferably a fluorescent pink resin particle, a fluorescent yellow resin particle, or a fluorescent green resin particle, and particularly preferably a fluorescent pink resin particle.

The fluorescence peak wavelength in a spectral reflectance of the fluorescent colorant may be appropriately selected depending on the desired color. For example, when it is desired to express fluorescence pink as a color, the fluorescence peak wavelength is preferably 560 nm or more and 670 nm or less, and more preferably 580 nm or more and 650 nm or less.

Figure 5:
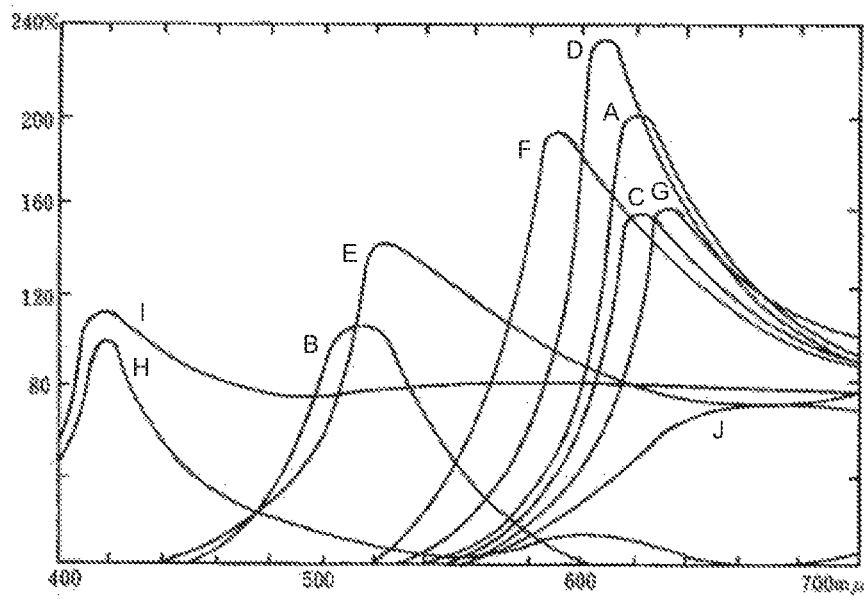
FIG. 5 is an example of the spectrum of each fluorescent color.

An example of the spectrum of each fluorescent color is shown in FIG. 5. In FIG. 5, the vertical axis represents fluorescence intensity and the horizontal axis represents wavelength. It is noted that "mμ"="nm".

The value of the spectral reflectance at the fluorescence peak wavelength of the fluorescent colorant is preferably 104% or more, more preferably 108% or more, and particularly more preferably 112% or more, from the viewpoint of image graininess.

As the fluorescent colorant A, a known fluorescent colorant may be used. Specific examples thereof include Basic Red 1 (Rhodamine 6G), Basic Red 1:1, Basic Red 2, Basic Red 12, Basic Red 13, Basic Red 14, Basic Red 15, Basic Red 36, Basic Violet 7, Basic Violet 10 (Rhodamine B), Basic Violet 11 (Rhodamine 3B), Basic Violet 11:1 (Rhodamine A), Basic Violet 15, Basic Violet 16, Basic Violet 27, Pigment Yellow 101, Basic Yellow 1, Basic Yellow 2, Basic Yellow 9, Basic Yellow 24, Basic Yellow 40, Basic Orange 15, Basic Orange 22, Basic Blue 1, Basic Blue 3, Basic Blue 7, Basic Blue 9, Basic Blue 45, Basic Green 1, Acid Yellow 3, Acid Yellow 7, Acid Yellow 73, Acid Yellow 87, Acid Yellow 184, Acid Yellow 245, Acid Yellow 250, Acid Red 51, Acid Red 52, Acid Red 57, Acid Red 77, Acid Red 87, Acid Red 89, Acid Red 92, Acid Blue 9, Acid Black 2, Solvent Yellow 43, Solvent Yellow 44, Solvent Yellow 85, Solvent Yellow 98, Solvent Yellow 116, Solvent Yellow 131, Solvent Yellow 145, Solvent Yellow 160:1, Solvent Yellow 172, Solvent Yellow 185, Solvent Yellow 195, Solvent Yellow 196, Solvent Orange 63, Solvent Orange 112, Solvent Red 49, Solvent Red 149, Solvent Red 175, Solvent Red 196, Solvent Red 197, Solvent Blue 5, Solvent Green 5, Solvent Green 7, Direct Yellow 27, Direct Yellow 85, Direct Yellow 96, Direct Orange 8, Direct Red 2, Direct Red 9, Direct Blue 22, Direct Blue 199, Direct Green 6, Disperse Yellow 11, Disperse Yellow 82, Disperse Yellow 139, Disperse Yellow 184, Disperse Yellow 186, Disperse Yellow 199, Disperse Yellow 202, Disperse Yellow 232, Disperse Orange 11, Disperse Orange 32, Disperse Red 58, Disperse Red 274, Disperse Red 277, Disperse Red 303, Disperse Blue 7, Reactive Yellow 78, and Vat Red 41.

One or more of these colors are selected according to the desired color. For example, when it is desired to express fluorescent pink, at least one fluorescent colorant selected from the group consisting of Basic Red 1 (Rhodamine 6G), Basic Red 1:1, Basic Red 2, Basic Red 12, Basic Red 13, Basic Red 14, Basic Red 15, Basic Red 36, Basic Violet 7, Basic Violet 10 (Rhodamine B), Basic Violet 11 (Rhodamine 3B), Basic Violet 11:1 (Rhodamine A), Basic Violet 15, Basic Violet 16, and Basic Violet 27 is preferred.

The fluorescent colorant A preferably contains a fluorescent colorant having a xanthene structure, a naphthalene structure, or a triarylmethane structure, and more preferably a fluorescent colorant having a xanthene structure, from the viewpoints of fluorescence intensity and tint.

In addition, the xanthene structure is preferably a Rhodamine structure, a fluorescein structure, or an eosin structure, and more preferably a Rhodamine structure.

The resin particle may contain the fluorescent colorant A alone or in combination of two or more types thereof.

The content of the fluorescent colorant A is preferably 0.2 mass % or more and 5 mass % or less, more preferably 0.2 mass % or more and 3 mass % or less, and particularly preferably 0.2 mass % or more and 2 mass % or less based on the whole resin particle, from the viewpoints of the fluorescence intensity and tint.

—Colorant B Other than Fluorescent Colorant A—

The colorant B may be any colorant other than the fluorescent colorant A, and a known colorant may be used.

The colorant B is preferably a colorant that does not exhibit fluorescence in the visible light region.

The colorant B may be a pigment or a dye, and is preferably a pigment.

Specific examples of the colorant B include: magenta pigments such as C. I. Pigment Red 1, C. I. Pigment Red 2, C. I. Pigment Red 3, C. I. Pigment Red 4, C. I. Pigment Red 5, C. I. Pigment Red 6, C. I. Pigment Red 7, C. I. Pigment Red 8, C. I. Pigment Red 9, C. I. Pigment Red 10, C. I. Pigment Red 11, C. I. Pigment Red 12, C. I. Pigment Red 14, C. I. Pigment Red 15, C. I. Pigment Red 16, C. I. Pigment Red 17, C. I. Pigment Red 18, C. I. Pigment Red 21, C. I. Pigment Red 22, C. I. Pigment Red 23, C. I. Pigment Red 31, C. I. Pigment Red 32, C. I. Pigment Red 38, C. I. Pigment Red 41, C. I. Pigment Red 48, C. I. Pigment Red 48:1, C. I. Pigment Red 48:2, C. I. Pigment Red 48:3, C. I. Pigment Red 48:4, C. I. Pigment Red 49, C. I. Pigment Red 52, C. I. Pigment Red 53:1, C. I. Pigment Red 54, C. I. Pigment Red 57:1, C. I. Pigment Red 58, C. I. Pigment Red 60:1, C. I. Pigment Red 63, C. I. Pigment Red 64:1, C. I. Pigment Red 68, C. I. Pigment Red 81:1, C. I. Pigment Red 81:4, C. I. Pigment Red 83, C. I. Pigment Red 88, C. I. Pigment Red 89, C. I. Pigment Red 112, C. I. Pigment Red 114, C. I. Pigment Red 122, C. I. Pigment Red 123, C. I. Pigment Red 144, C. I. Pigment Red 146, C. I. Pigment Red 149, C. I. Pigment Red 150, C. I. Pigment Red 166, C. I. Pigment Red 170, C. I. Pigment Red 176, C. I. Pigment Red 177, C. I. Pigment Red 178, C. I. Pigment Red 179, C. I. Pigment Red 184, C. I. Pigment Red 185, C. I. Pigment Red 187, C. I. Pigment Red 202, C. I. Pigment Red 206, C. I. Pigment Red 207, C. I. Pigment Red 208, C. I. Pigment Red 209, C. I. Pigment Red 210, C. I. Pigment Red 220, C. I. Pigment Red 221, C. I. Pigment Red 238, C. I. Pigment Red 242, C. I. Pigment Red 245, C. I. Pigment Red 253, C. I. Pigment Red 254, C. I. Pigment Red 255, C. I. Pigment Red 256, C. I. Pigment Red 258, C. I. Pigment Red 264, C. I. Pigment Red 266, C. I. Pigment Red 269, C. I. Pigment Red 282, and Pigment Violet 19; magenta dyes such as C. I. Solvent Red 1, C. I. Solvent Red 3, C. I. Solvent Red 8, C. I. Solvent Red 23, C. I. Solvent Red 24, C. I. Solvent Red 25, C. I. Solvent Red 27, C. I. Solvent Red 30, C. I. Solvent Red 49, C. I. Solvent Red 52, C. I. Solvent Red 58, C. I. Solvent Red 63, C. I. Solvent Red 81, C. I. Solvent Red 82, C. I. Solvent Red 83, C. I. Solvent Red 84, C. I. Solvent Red 100, C. I. Solvent Red 109, C. I. Solvent Red 111, C. I. Solvent Red 121, C. I. Solvent Red 122, C. I. Disperse Red 9, C. I. Basic red 1, C. I. Solvent Red 2, C. I. Solvent Red 9, C. I. Solvent Red 12, C. I. Solvent Red 13, C. I. Solvent Red 14, C. I. Solvent Red 15, C. I. Solvent Red 17, C. I. Solvent Red 18, C. I. Solvent Red 22, C. I. Solvent Red 23, C. I. Solvent Red 24, C. I. Solvent Red 27, C. I. Solvent Red 29, C. I. Solvent Red 32, C. I. Solvent Red 34, C. I. Solvent Red 35, C. I. Solvent Red 36, C. I. Solvent Red 37, C. I. Solvent Red 38, C. I. Solvent Red 39, and C. I. Solvent Red 40; and various pigments or various dyes such as Red iron oxide, Cadmium Red, Red lead, mercury sulfide, Permanent red 4R, Resole Red, Pyrazolone Red, Watching Red, calcium salt, Lake Red D, Brilliant Carmine 6B, Eosin Lake, Rotamine Rake B, Alizarin Rake, Brilliant Carmine 3B, Carbon Black, Chrome Yellow, Hansa Yellow, Benzidine Yellow, Slene Yellow, Quinoline Yellow, Pigment Yellow, Permanent Orange GTR, Pyrazolone Orange, Balkan Orange, Brilliant Carmine 3B, Brilliant Carmine 6B, DuPont Oil Red, Lake Red C, Aniline Blue, Ultramarine Blue, Chalco oil blue, methylene blue chloride, Phthalocyanine blue, Pigment blue, Phthalocyanine green, and Malachite green oxalate. In addition, a solid solution pigment in which two or more types of pigments are solid-solved to change the crystal structure, is also preferred, and specific examples include a combination of quinacridones with different substituents (unsubstituted quinacridones PV19 and PR122, PV19 and PR202, etc.).

The colorant B is appropriately selected according to the desired color. For example, when it is desired to express fluorescence pink, an example is to contain a magenta pigment. Among these, a solid solution pigment is preferred. The fluorescent color has good performance if it produces a bright color or a dark color even with the same tint, and the performance tends to be improved by using a solid solution pigment.

The colorant B may be used alone or in combination of two or more thereof.

As the colorant B, a surface-treated colorant may be used as necessary, or the colorant B may be used in combination with a dispersant. A plurality of types of colorants may be used in combination.

The content of the colorant B is preferably 0.1 mass % or more and 2 mass % or less, more preferably 0.1 mass % or more and 1.5 mass % or less, and particularly preferably 0.1 mass % or more and 1 mass % or less based on the whole resin particle, from the viewpoints of the fluorescence intensity and tint.

The value of the ratio WB/WA of the content WB of the colorant B to the content WA of the fluorescent colorant A in the resin particle is preferably 1.25 or less, more preferably 1.0 or less, and particularly preferably 0.5 or less, from the viewpoints of the fluorescence intensity and tint.

—Binder Resin—

Examples of the binder resin include vinyl-based resins obtained from a homopolymer of monomers such as styrenes (such as styrene, parachlorostyrene, and α-methylstyrene), (meth)acrylates (such as methyl acrylate, ethyl acrylate, n-propyl acrylate, n-butyl acrylate, lauryl acrylate, 2-ethylhexyl acrylate, methyl methacrylate, ethyl methacrylate, n-propyl methacrylate, lauryl methacrylate, and 2-ethylhexyl methacrylate), ethylenically unsaturated nitriles (such as acrylonitrile and methacrylonitrile), vinyl ethers (such as vinyl methyl ether and vinyl isobutyl ether), vinyl ketones (such as vinyl methyl ketone, vinyl ethyl ketone, and vinyl isopropenyl ketone), and olefins (such as ethylene, propylene, and butadiene), or a copolymer combining two or more of these monomers.

Examples of the binder resin also include non-vinyl-based resins such as an epoxy resin, a polyester resin, a polyurethane resin, a polyamide resin, a cellulose resin, a polyether resin, and a modified rosin, a mixture of these non-vinyl-based resins and the vinyl-based resins, or a graft polymer obtained by polymerizing a vinyl-based monomer in the coexistence of these non-vinyl-based resins.

Among these, a styrene-acrylic copolymer or a polyester resin is preferably used, and a polyester resin is more preferably used.

These binder resins may be used alone or in combination of two or more thereof.

The binder resin preferably contains a polyurethane resin from the viewpoints of the dispersibility, fluorescence intensity, and tint of the colorant.

The polyurethane resin may be a polyester polyurethane resin, a polyether polyurethane resin or the like. Among these, a polyester polyurethane resin is preferred. Preferred examples of the polyester polyurethane resin include a resin obtained by reacting a polyisocyanate compound (preferably a diisocyanate compound) with a polyester resin (preferably polyester diol) having at least one group selected from the group consisting of a hydroxy group and a carboxy group.

Further, the binder resin preferably contains a polyurethane resin and a styrene-acrylic copolymer or a polyester resin, and more preferably contains a polyurethane resin and a polyester resin, from the viewpoints of the dispersibility, fluorescence intensity and tint of the colorant. In the case of containing a styrene-acrylic copolymer, an acrylic-polyurethane resin is preferred from the viewpoint of compatibility.

It is preferable that, for example, in the sea-island structure, the island structure contains a polyurethane resin as the binder resin, and the sea structure contains a styrene-acrylic copolymer or a polyester resin as the binder resin.

Examples of the binder resin include an amorphous (also referred to as "non-crystalline") resin and a crystalline resin.

The binder resin preferably contains a crystalline resin, and more preferably contains an amorphous resin and a crystalline resin, from the viewpoint of preventing density unevenness of the obtained image.

The content of the crystalline resin is preferably 2 mass % or more and 40 mass % or less, and more preferably 2 mass % or more and 20 mass % or less based on the total mass of the binder resin.

The "crystalline" of a resin refers to having a clear endothermic peak instead of a stepwise endothermic change in differential scanning calorimetry (DSC), and specifically refers to that the half-width of the endothermic peak at the time of being measured at a temperature evaluation rate of 10 (° C./min) is within 10° C.

On the other hand, the "amorphous" of the resin refers to that the half-value width is larger than 10° C., that the endothermic amount changes stepwise, or that no clear endothermic peak is observed.

<<Polyester Resin>>

Examples of the polyester resin include known polyester resins.

Amorphous Polyester Resin

Examples of the amorphous polyester resin include a polycondensate of a polycarboxylic acid and a polyhydric alcohol. As the amorphous polyester resin, a commercially available product or a synthesized product may be used.

Examples of the polycarboxylic acid include aliphatic dicarboxylic acids (such as oxalic acid, malonic acid, maleic acid, fumaric acid, citraconic acid, itaconic acid, glutaconic acid, succinic acid, alkenylsuccinic acid, adipic acid, and sebacic acid), alicyclic dicarboxylic acids (such as cyclohexanedicarboxylic acid), aromatic dicarboxylic acids (such as terephthalic acid, isophthalic acid, phthalic acid, and naphthalenedicarboxylic acid), and an anhydride or a lower alkyl ester (for example, having 1 or more and 5 or less carbon atoms) thereof. Among these, the polycarboxylic acid is preferably, for example, an aromatic dicarboxylic acid.

As the polycarboxylic acid, a tricarboxylic acid or higher carboxylic acid having a cross-linked structure or a branched structure may be used in combination with a dicarboxylic acid. Examples of the tricarboxylic acid or higher carboxylic acid include trimellitic acid, pyromellitic acid, and an anhydride or a lower alkyl ester (for example, having 1 or more and 5 or less carbon atoms) thereof.

The polycarboxylic acid may be used alone or in combination of two or more thereof.

Examples of the polyhydric alcohol include aliphatic diols (such as ethylene glycol, diethylene glycol, triethylene glycol, propylene glycol, butanediol, hexanediol, and neopentyl glycol), alicyclic diols (such as cyclohexanediol, cyclohexanedimethanol, and hydrogenated bisphenol A), and aromatic diols (such as a bisphenol A ethylene oxide adduct and a bisphenol A propylene oxide adduct). Among these, the polyhydric alcohol is preferably, for example, an aromatic diol and an alicyclic diol, and more preferably an aromatic diol.

As the polyhydric alcohol, a trihydric alcohol or higher polyhydric alcohol having a cross-linked structure or a branched structure may be used in combination with a diol. Examples of the trihydric alcohol or higher polyhydric alcohol include glycerin, trimethylolpropane, and pentaerythritol.

The polyhydric alcohol may be used alone or in combination of two or more thereof.

The glass transition temperature (Tg) of the amorphous polyester resin is preferably 50° C. or higher and 80° C. or lower, and more preferably 50° C. or higher and 65° C. or lower.

The glass transition temperature is obtained from a DSC curve obtained by differential scanning calorimetry (DSC), and is more specifically obtained by the "extrapolated glass transition onset temperature" described as a method for obtaining the glass transition temperature in JIS K 7121-1987 "Method for measuring glass transition temperature of plastics".

The weight average molecular weight Mw of the amorphous polyester resin is preferably 5,000 or more and 1,000,000 or less, and more preferably 7,000 or more and 500,000 or less.

The number average molecular weight Mn of the amorphous polyester resin is preferably 2,000 or more and 100,000 or less.

The molecular weight distribution Mw/Mn of the amorphous polyester resin is preferably 1.5 or more and 100 or less, and more preferably 2 or more and 60 or less. The weight average molecular weight and the number average molecular weight are measured by gel permeation chromatography (GPC). The molecular weight is measured by GPC by using a GPC HLC-8120GPC manufactured by Tosoh Corporation as a measurement device, a column TSKgel Super HM-M (15 cm) manufactured by Tosoh Corporation, and a THF solvent. The weight average molecular weight and the number average molecular weight are calculated from the measurement result using a molecular weight calibration curve prepared using a monodispersed polystyrene standard sample.

The amorphous polyester resin is obtained by a well-known production method. Specifically, for example, the amorphous polyester resin may be obtained by a method in which the polymerization temperature is set to 180° C. or higher and 230° C. or lower, the pressure in the reaction system is reduced as necessary, and the reaction is performed while removing water and alcohol generated during the condensation.

When raw material monomers are insoluble or incompatible at the reaction temperature, a high boiling point solvent may be added as a dissolution assisting agent for dissolution. In this case, the polycondensation reaction is carried out while distilling off the dissolution assisting agent. When there is a poorly compatible monomer, it is preferable that the poorly compatible monomer is firstly condensed with an acid or alcohol to be polycondensed with the poorly compatible monomer and then the obtained product is polycondensed with the main component.

Crystalline Polyester Resin

Examples of the crystalline polyester resin include a polycondensate of a polycarboxylic acid and a polyhydric alcohol. As the crystalline polyester resin, a commercially available product or a synthesized product may be used.

Here, in order to easily form a crystalline structure, the crystalline polyester resin is preferably a polycondensate using a polymerizable monomer having a linear aliphatic group rather than a polymerizable monomer having an aromatic group.

Examples of the polycarboxylic acid include aliphatic dicarboxylic acids (such as oxalic acid, succinic acid, glutaric acid, adipic acid, suberic acid, azelaic acid, sebacic acid, 1,9-nonanedicarboxylic acid, 1,10-decanedicarboxylic acid, 1,12-dodecanedicarboxylic acid, 1,14-tetradecanedicarboxylic acid, and 1,18-octadecanedicarboxylic acid), aromatic dicarboxylic acids (for example, dibasic acids such as phthalic acid, isophthalic acid, terephthalic acid, and naphthalene-2,6-dicarboxylic acid), and an anhydride or a lower alkyl ester (for example, having 1 or more and 5 or less carbon atoms) thereof.

As the polycarboxylic acid, a tricarboxylic acid or higher carboxylic acid having a cross-linked structure or a branched structure may be used in combination with a dicarboxylic acid. Examples of the tricarboxylic acid include aromatic carboxylic acids (such as 1,2,3-benzenetricarboxylic acid, 1,2,4-benzenetricarboxylic acid, and 1,2,4-naphthalenetricarboxylic acid), and an anhydride or a lower alkyl ester (for example, having 1 or more and 5 or less carbon atoms) thereof.

As the polycarboxylic acid, a dicarboxylic acid having a sulfonic acid group or a dicarboxylic acid having an ethylenic double bond may be used in combination with these dicarboxylic acids.

The polycarboxylic acid may be used alone or in combination of two or more thereof.

Examples of the polyhydric alcohol include aliphatic diols (such as a linear aliphatic diol having 7 or more and 20 or less carbon atoms in the main chain portion). Examples of the aliphatic diol include ethylene glycol, 1,3-propanediol, 1,4-butanediol, 1,5-pentanediol, 1,6-hexanediol, 1,7-heptanediol, 1,8-octanediol, 1,9-nonanediol, 1,10-decanediol, 1,11-undecanediol, 1,12-dodecanediol, 1,13-tridecanediol, 1,14-tetradecanediol, 1,18-octadecanediol, and 1,14-eicosanedecanediol. Among these, the aliphatic diol is preferably 1,8-octanediol, 1,9-nonanediol, and 1,10-decanediol.

As the polyhydric alcohol, a trihydric alcohol or higher alcohol having a cross-linked structure or a branched structure may be used in combination with a diol. Examples of the trihydric alcohol or higher polyhydric alcohol include glycerin, trimethylolethane, trimethylolpropane, and pentaerythritol.

The polyhydric alcohol may be used alone or in combination of two or more thereof.

Here, the polyhydric alcohol preferably has an aliphatic diol content of 80 mol % or more, and preferably 90 mol % or more.

The melting temperature of the crystalline polyester resin is preferably 50° C. or higher and 100° C. or lower, more preferably 55° C. or higher and 90° C. or lower, and still more preferably 60° C. or higher and 85° C. or lower.

The melting temperature is obtained from the DSC curve obtained by differential scanning calorimetry (DSC) according to the "melting peak temperature" described as a method for obtaining the melting temperature in JIS K 7121-1987 "Method for measuring transition temperature of plastics".

The weight average molecular weight Mw of the crystalline polyester resin is preferably 6,000 or more and 35,000 or less.

The crystalline polyester resin may be obtained by a well-known production method, similar to the amorphous polyester resin.

The weight average molecular weight Mw of the binder resin is preferably 5,000 or more and 1,000,000 or less, more preferably 7,000 or more and 500,000 or less, and particularly preferably 25,000 or more and 60,000 or less, from the viewpoint of scratch resistance of the image. The number average molecular weight Mn of the binder resin is preferably 2,000 or more and 100,000 or less. The molecular weight distribution Mw/Mn of the binder resin is preferably 1.5 or more and 100 or less, and more preferably 2 or more and 60 or less.

The weight average molecular weight and the number average molecular weight of the binder resin are measured by gel permeation chromatography (GPC). The molecular weight is measured by GPC by using a GPC HLC-8120GPC manufactured by Tosoh Corporation as a measurement device, a column TSKgel Super HM-M (15 cm) manufactured by Tosoh Corporation, and a tetrahydrofuran (THF) solvent. The weight average molecular weight and the number average molecular weight are calculated from the measurement result using a molecular weight calibration curve prepared using a monodispersed polystyrene standard sample.

The content of the binder resin is preferably 40 mass % or more and 95 mass % or less, more preferably 50 mass % or more and 90 mass % or less, and still more preferably 60 mass % or more and 85 mass % or less, based on the whole resin particle.

—Release Agent—

Examples of the release agent include: hydrocarbon wax; natural wax such as carnauba wax, rice wax, and candelilla wax; synthetic wax or mineral or petroleum wax such as montan wax; and ester wax such as fatty acid ester and montanic acid ester. The release agent is not limited thereto.

The melting temperature of the release agent is preferably 50° C. or higher and 110° C. or lower, and more preferably 60° C. or higher and 100° C. or lower.

The melting temperature is obtained from the DSC curve obtained by differential scanning calorimetry (DSC) according to the "melting peak temperature" described as a method for obtaining the melting temperature in JIS K 7121-1987 "Method for measuring transition temperature of plastics".

The content of the release agent is preferably 1 mass % or more and 20 mass % or less, and more preferably 5 mass % or more and 15 mass % or less, based on the whole resin particle.

—Other Additives—

Examples of other additives include known additives such as magnetic materials, charge control agents, and inorganic powders. These additives are contained in the resin particle as internal additives.

—Characteristics of Resin Particle—

The resin particle may be a resin particle having a single-layer structure, or a so-called core-shell structure resin particle (a core-shell type particle) composed of a core portion (a core particle) and a coating layer (a shell layer) for coating the core portion. The core-shell structure resin particle includes, for example, a core portion containing a binder resin and, if necessary, a colorant and a release agent, and a coating layer containing a binder resin.

Among these, the resin particle is preferably a resin particle having a core-shell structure. When a dye is used as the fluorescent colorant A or the colorant B and the dye is present on the surface of the resin particle, the electrical characteristics may be influenced in some way since the dye is easily compatible with water. However, when the shell structure is formed of a resin that does not contain a dye, the dye is confined inside, and thus such an influence is unlikely to occur, which is preferred.

The volume average particle diameter $D_{50v}$ of the resin particle is preferably 2 μm or more and 10 μm or less, more preferably 4 μm or more and 8 μm or less, and particularly preferably 5 μm or more and 6 μm or less.

The volume average particle diameter of the resin particle is measured using a Coulter Multisizer II (manufactured by Beckman Coulter, Inc.) and the electrolytic solution is ISOTON-II (manufactured by Beckman Coulter, Inc.).

In the measurement, 0.5 mg or more and 50 mg or less of a measurement sample is added to 2 mL of a 5 mass % aqueous solution of a surfactant (preferably sodium alkylbenzenesulfonate) as a dispersant. The obtained mixture is added to 100 mL or more and 150 mL or less of the electrolytic solution.

The electrolytic solution in which the sample is suspended is subjected to a dispersion treatment for 1 minute with an ultrasonic disperser, and the Coulter Multisizer II is used to measure the particle diameter of particles having a particle diameter in the range of 2 μm or more and 60 μm or less using an aperture having an aperture diameter of 100 μm. 50,000 particles are sampled.

With respect to the measured particle diameter, a cumulative distribution by volume is drawn from the side of the small diameter, and the particle diameter corresponding to the cumulative percentage of 50% is defined as the volume average particle diameter $D_{50v}$.

In the exemplary embodiment, the average circularity of the resin particle is not particularly limited, and is preferably 0.91 or more and 0.98 or less, more preferably 0.94 or more and 0.98 or less, and still more preferably 0.95 or more and 0.97 or less, from the viewpoint of improving the cleaning property of an image carrier.

In the exemplary embodiment, the circularity of the resin particle is (circumference length of a circle having the same projected area as that of a particle image)/(circumference length of a particle projected image), and the average circularity of the resin particle is the circularity corresponding to the cumulative percentage of 50% from the smaller side in a cumulative distribution. The average circularity of the resin particle is obtained by analyzing at least 3,000 resin particles with a flow type particle image analyzer.

The average circularity of the resin particle may be controlled by adjusting the stirring speed of the dispersion liquid, the temperature of the dispersion liquid, or the holding time in the fusion and coalesce step, for example, when the resin particle is produced by an aggregation and coalescence method.

(External Additive)

When the resin particle is used as an electrostatic charge image developing toner described below, the resin particle may contain an external additive, if necessary.

The resin particle may be a resin particle containing no external additive, or a resin particle externally added with an external additive.

Examples of the external additive include inorganic particles. Examples of the inorganic particles include $SiO_2$, $TiO_2$, $Al_2O_3$, CuO, ZnO, $SnO_2$, $CeO_2$, $Fe_2O_3$, MgO, BaO, CaO, $K_2O$, $Na_2O$, $ZrO_2$, $CaO·SiO_2$, $K_2O·(TiO_2)_n$, $Al_2O_3·2SiO_2$, $CaCO_3$, $MgCO_3$, $BaSO_4$, and $MgSO_4$.

The surface of the inorganic particles as an external additive is preferably subjected to a hydrophobic treatment. The hydrophobic treatment is performed, for example, by immersing the inorganic particles in a hydrophobic treatment agent. The hydrophobic treatment agent is not particularly limited, and examples thereof include a silane coupling agent, a silicone oil, a titanate coupling agent, and an aluminum coupling agent. The hydrophobic treatment agent may be used alone or in combination of two or more thereof.

The amount of the hydrophobic treatment agent is, for example, preferably 1 part by mass or more and 10 parts by mass or less based on 100 parts by mass of the inorganic particles.

Examples of the external additive include resin particles (such as polystyrene, polymethylmethacrylate (PMMA), and melamine resin), and cleaning activators (such as metal salts of higher fatty acids typified by zinc stearate, and particles of fluoropolymer).

The amount of the external additive is, for example, preferably 0.01 mass % or more and 10 mass % or less, and more preferably 0.01 mass % or more and 6 mass % or less, based on the resin particle.

<Use of Resin Particle>

The resin particle according to the exemplary embodiment is preferably used as an image forming resin particle, and more preferably used as an electrostatic charge image developing toner.

In addition, the resin particle according to the exemplary embodiment is also preferably used as a powder paint. The powder paint may be also used for producing a coated product. A surface to be coated are coated with the powder paint and then heated (baked) the surface to form a coating film in which the powder paint is hardened so as to produce a coated product. In this case, the coating and heating (baking) may be performed collectively.

For the powder coating, well-known coating methods such as spray coating, electrostatic powder coating, triboelectric powder coating, and fluidized dipping may be used. The thickness of the coating film of the powder is preferably 30 μm or more and 50 μm or less, for example.

The heating temperature (baking temperature) is, for example, preferably 90° C. or higher and 250° C. or lower, more preferably 100° C. or higher and 220° C. or lower, and still more preferably 120° C. or higher and 200° C. or lower. The heating time (baking time) is adjusted according to the heating temperature (baking temperature).

The target article to be coated with the powder is not particularly limited, and examples thereof include various kinds of metal parts, ceramic parts, and resin parts. These target articles may be unmolded articles before being formed into respective articles such as plate-like articles and linear articles, or may be molded articles formed for electronic parts, road vehicles, building interior and exterior materials, or the like. The target article may be an article whose surface to be coated has been subjected to a surface treatment such as a primer treatment, a plating treatment, and electrodeposition coating in advance.

Besides, in the fields other than coating, the resin particle according to the exemplary embodiment is also preferably used as a resin particle for a toner display.

A toner display in which charged resin particles are dispersed in a medium (often air) and an image is displayed by moving the resin particles by an electric field is known. The resin particle according to the exemplary embodiment may be adopted in such a toner display without problems. For example, an image is displayed by charging resin particles into a cell sandwiched between two transparent electrodes and applying a voltage to move the resin particles.

[Method for Producing Resin Particle]

Next, a method for producing the resin particle according to the exemplary embodiment will be described.

The resin particle according to the exemplary embodiment may have the external additive added to the resin particle after the resin particle is produced.

The resin particle may be produced by either a dry production method (for example, a kneading pulverization method) or a wet production method (for example, an aggregation and coalescence method, a suspension polymerization method, and a dissolution suspension method). These production methods are not particularly limited and known production methods are adopted. Among these, the resin particle is preferably obtained by the aggregation and coalescence method.

Examples of the aggregation and coalescence method include the methods described in JP-A-2010-97101 and JP-A-2006-154641.

Examples of the kneading pulverization method include the method described in JP-A-2000-267338.

Examples of the dissolution suspension method include the method described in JP-A-2000-258950.

Specifically, in the case of producing the resin particle by the aggregation and coalescence method, the resin particle is produced by, for example, a step of preparing a resin particle dispersion liquid in which binder resin particles are dispersed (resin particle dispersion liquid preparation step), a step of aggregating resin particles and if necessary other particles in the resin particle dispersion liquid or a dispersion liquid after mixing other particle dispersion liquids if necessary, to form aggregated particles (aggregated particle forming step), and a step of heating an aggregated particle dispersion liquid in which the aggregated particles are dispersed to fuse and coalesce the aggregated particles to form resin particles (fusion and coalesce step).

Hereinafter, the details of each step will be described.

In the following description, a method for obtaining a resin particle containing a colorant and a release agent will be described, but the colorant and the release agent are used as necessary. Of course, other additives other than the colorant and the release agent may be used.

Further, in the following description, the colorant includes at least one colorant selected from the group consisting of the fluorescent colorant A and the colorant B. As a colorant particle dispersion liquid, a fluorescent colorant A particle dispersion liquid and a colorant B particle dispersion liquid may be prepared. Further, the fluorescent colorant A particle dispersion liquid is preferably prepared as a resin particle dispersion liquid containing the fluorescent colorant A, and more preferably a urethane resin particle dispersion liquid containing the fluorescent colorant A. The resin particle dispersion liquid containing the fluorescent colorant A may be a resin particle dispersion liquid containing the colorant B, in which the colorant B is used instead of the fluorescent colorant A.

—Resin Particle Dispersion Liquid Preparation Step—

A colorant particle dispersion liquid in which colorant particles are dispersed and a release agent particle dispersion liquid in which release agent particles are dispersed are prepared together with a resin particle dispersion liquid in which binder resin particles are dispersed.

The resin particle dispersion liquid is prepared, for example, by dispersing resin particles in a dispersion medium with a surfactant.

Examples of the dispersion medium for use in the resin particle dispersion liquid include an aqueous medium.

Examples of the aqueous medium include water such as distilled water and ion-exchanged water, and alcohols. The aqueous medium may be used alone or in combination of two or more thereof.

Examples of the surfactant include: sulfate ester salt-based, sulfonate-based, phosphate ester-based, and soap-based anionic surfactants; amine salt-based and quaternary ammonium salt-based cationic surfactants; and polyethylene glycol-based, alkylphenol ethylene oxide adduct-based, and polyhydric alcohol-based nonionic surfactants. Among these, anionic surfactants and cationic surfactants are particularly preferred. The nonionic surfactant may be used in combination with an anionic surfactant or a cationic surfactant.

Among these, it is preferable to use a nonionic surfactant, and it is preferable to use a nonionic surfactant in combination with an anionic surfactant or a cationic surfactant.

The surfactant may be used alone or in combination of two or more thereof.

For the resin particle dispersion liquid, examples of a method of dispersing the resin particles in the dispersion medium include general dispersion methods using a rotary shearing homogenizer, a ball mill having a media, a sand mill, and a dyno mill, or the like. Depending on the type of the resin particles, the resin particles may be dispersed in the dispersion medium by using a phase inversion emulsification method. The phase inversion emulsification method is a method of dispersing a resin in an aqueous medium in the form of particles by dissolving a resin to be dispersed in a hydrophobic organic solvent in which the resin is soluble, adding a base to the organic continuous phase (O phase) for neutralization, and then adding an aqueous medium (W phase) to change the phase from W/O to O/W.

The volume average particle diameter of the resin particles dispersing in the resin particle dispersion liquid is preferably, for example, 0.01 µm or more and 1 µm or less, more preferably 0.08 µm or more and 0.8 µm or less, and still more preferably 0.1 µm or more and 0.6 µm or less.

Regarding the volume average particle diameter of the resin particles, a cumulative distribution by volume is drawn from the side of the smallest diameter with respect to particle diameter ranges (so-called channels) separated using the particle diameter distribution obtained by the measurement of a laser diffraction-type particle diameter distribution measurement device (for example, LA-700 manufactured by Horiba, Ltd.), and a particle diameter corresponding to the cumulative percentage of 50% with respect to the entire particles is set as a volume average particle diameter $D_{50v}$. The volume average particle diameter of the particles in other dispersion liquids is measured in the same manner.

The content of the binder resin particles contained in the resin particle dispersion liquid is preferably 5 mass % or more and 50 mass % or less, and more preferably 10 mass % or more and 40 mass % or less.

For example, the colorant particle dispersion liquid and the release agent particle dispersion liquid are prepared in the same manner as the resin particle dispersion liquid. That is, regarding the volume average particle diameter of particles, the dispersion medium, the dispersion method, and the content of the particles in the resin particle dispersion liquid, the same applies to the colorant particles dispersed in the colorant particle dispersion liquid and the release agent particles dispersed in the release agent particle dispersion liquid.

—Aggregated Particle Forming Step—

Next, the resin particle dispersion liquid, the colorant particle dispersion liquid, and the release agent particle dispersion liquid are mixed.

Then, in the mixed dispersion liquid, the resin particles, the colorant particles, and the release agent particles are hetero-aggregated to form aggregated particles containing the resin particles, the colorant particles, and the release agent particles and having a diameter close to the diameter of the target resin particles.

Specifically, for example, an aggregating agent is added to the mixed dispersion liquid, the pH of the mixed dispersion liquid is adjusted to acidic (e.g., a pH of 2 or more and 5 or less), and a dispersion stabilizer is added if necessary. Then, the resin particles are heated to a temperature, specifically, for example, (the glass transition temperature of resin particles—30° C.) or higher and (the glass transition temperature of resin particles—10° C.) or lower, close to the glass transition temperature to aggregate the particles dispersed in the mixed dispersion liquid, and thus the aggregated particles are formed.

In the aggregated particle forming step, for example, while stirring the mixed dispersion liquid with a rotary shear homogenizer, an aggregating agent is added at room temperature (e.g., 25° C.), the pH of the mixed dispersion liquid is adjusted to acidic (e.g., a pH of 2 or more and 5 or less), and a dispersion stabilizer is added if necessary. Then, the heating may be performed.

Examples of the aggregating agent include a surfactant having a polarity opposite to that of the surfactant contained in the mixed dispersion liquid, an inorganic metal salt, and a divalent or higher metal complex. When a metal complex is used as the aggregating agent, the amount of the surfactant used is reduced and the charging characteristics are improved.

If necessary, an additive that forms a complex or a similar bond with the metal ion of the aggregating agent may be used in combination with the aggregating agent. A chelating agent is preferably used as the additive.

Examples of the inorganic metal salt include: metal salts such as calcium chloride, calcium nitrate, barium chloride, magnesium chloride, zinc chloride, aluminum chloride, and aluminum sulfate; and inorganic metal salt polymers such as polyaluminum chloride, polyaluminum hydroxide, and calcium polysulfide.

A water-soluble chelating agent may be used as the chelating agent. Examples of the chelating agent include: oxycarboxylic acids such as tartaric acid, citric acid and gluconic acid; and aminocarboxylic acids such as iminodiacetic acid (IDA), nitrilotriacetic acid (NTA), and ethylenediaminetetraacetic acid (EDTA).

The amount of the aggregating agent added is preferably 0.01 part by mass or more and 5.0 parts by mass or less, and more preferably 0.1 part by mass or more and less than 3.0 parts by mass, based on 100 parts by mass of the resin particles.

—Fusion and Coalesce Step—

Next, the aggregated particle dispersion liquid in which the aggregated particles are dispersed is heated to, for example, a temperature equal to or higher than the glass transition temperature of the resin particles (e.g., a temperature higher than the glass transition temperature of the resin particles by 30° C. to 50° C.) and equal to or higher than the melting temperature of the release agent to fuse and coalesce the aggregated particles to form the resin particles.

In the fusion and coalesce step, at a temperature equal to or higher than the glass transition temperature of the resin particles and equal to or higher than the melting temperature of the release agent, the resin and the release agent are in a compatible state. Thereafter, the resin particles are obtained after cooling.

As a method of adjusting the aspect ratio of the release agent in the resin particles, the adjustment may be performed by promoting crystal growth by keeping the temperature around the freezing point of the release agent for a certain time during the cooling, or by promoting crystal growth by using two or more types of release agents with different melting temperatures during the cooling.

After the above steps, the resin particles are obtained.

The resin particles may also be produced by a step of forming second aggregated particles by obtaining an aggregated particle dispersion liquid in which aggregated particles are dispersed, and then further mixing the aggregated particle dispersion liquid and a resin particle dispersion liquid in which resin particles are dispersed to further adhere and aggregate the resin particles to the surface of the aggregated particles, and a step of forming core-shell structure resin particles by heating a second aggregated particle dispersion liquid in which the second aggregated particles are dispersed to fuse and coalesce the second aggregated particles.

After the fusion and coalesce step, the resin particles formed in the solution are subjected to known washing step, solid-liquid separation step, and drying step to obtain dried resin particles. In the washing step, from the viewpoint of chargeability, it is preferable to sufficiently perform displacement washing with ion-exchanged water. In the solid-liquid separation step, suction filtration, pressure filtration or the like may be performed from the viewpoint of productivity. In the drying step, freeze-drying, air-flow drying, fluidized drying, vibration-type fluidized drying or the like may be performed from the viewpoint of productivity.

The resin particle according to the exemplary embodiment may be produced, for example, by adding an external additive to the obtained dried resin particles and mixing the two. The mixing may be performed by, for example, a V blender, a Henschel mixer, or a Loedige mixer. Further, if necessary, coarse particles in the resin particles may be removed using a vibration sieving machine, a wind sieving machine or the like.

<Electrostatic Charge Image Developer>

When the resin particle according to the exemplary embodiment is used as an electrostatic charge image developer, a one-component developer containing only the resin particle according to the exemplary embodiment may be used, or a two-component developer obtained by mixing the resin particle and a carrier may be used.

The carrier is not particularly limited, and known carriers may be used. Examples of the carrier include a coated carrier obtained by coating a resin on the surface of a core material made of magnetic powder, a magnetic-powder-dispersed carrier obtained by dispersing and mixing magnetic powder in a matrix resin, and a resin-impregnated carrier obtained by impregnating a resin into porous magnetic powder. The magnetic-powder-dispersed carrier and the resin-impregnated carrier may be carriers in which constituent particles of the carrier are used as a core material and the surface of the core material is coated with a resin.

Examples of the magnetic powder include magnetic metals such as iron, nickel and cobalt; and magnetic oxides such as ferrite and magnetite.

Examples of the coating resin and the matrix resin include polyethylene, polypropylene, polystyrene, polyvinyl acetate, polyvinyl alcohol, polyvinyl butyral, polyvinyl chloride, polyvinyl ether, polyvinyl ketone, a vinyl chloride-vinyl acetate copolymer, a styrene-acrylate copolymer, a straight silicone resin containing an organosiloxane bond or a modified product thereof, a fluorine resin, a polyester, a polycarbonate, a phenol resin, and an epoxy resin. The coating resin and the matrix resin may contain an additive such as conductive particles. Examples of the conductive particles include particles of metals such as gold, silver and copper, carbon black, titanium oxide, zinc oxide, tin oxide, barium sulfate, aluminum borate and potassium titanate.

Among these, from the viewpoint of preventing density unevenness of the obtained image, a carrier obtained by coating the surface with a resin containing a silicone resin is preferred, and a carrier obtained by coating the surface with a silicone resin is more preferred.

To coat the surface of the core material with a resin, a method of coating the surface with a coating layer forming solution in which the coating resin and various additives (used as necessary) are dissolved in an appropriate solvent is used. The solvent is not particularly limited, and may be selected in consideration of the type of the resin used, coating suitability and the like. Specific examples of a resin coating method include an immersion method of immersing a core material in a coating layer forming solution, a spray method of spraying a coating layer forming solution on the surface of the core material, a fluidized bed method of spraying a coating layer forming solution while suspending the core material by fluidized air, and a kneader coater method of mixing a carrier core material and a coating layer forming solution in a kneader coater and then removing the solvent.

In the two-component developer, the mixing ratio (mass ratio) of the resin particles (electrostatic charge image developing toner) to the carrier is preferably resin particles (electrostatic charge image developing toner):carrier=1:100 to 30:100, and more preferably 3:100 to 20:100.

<Image Forming Apparatus and Image Forming Method>

An image forming apparatus and image forming method when the resin particle according to the exemplary embodiment is used as an electrostatic charge image developing toner will be described.

The image forming apparatus includes: an image carrier; a charging unit for charging the surface of the image carrier; an electrostatic charge image forming unit for forming an electrostatic charge image on the surface of the charged image carrier; a developing unit for storing an electrostatic charge image developer and developing, as a toner image, the electrostatic charge image formed on the surface of the image carrier by using the electrostatic charge image developer; a transfer unit for transferring the toner image formed on the surface of the image carrier onto the surface of a recording medium; and a fixing unit for fixing the toner image transferred on the surface of the recording medium. Then, the electrostatic charge image developer according to the exemplary embodiment is applied as the electrostatic charge image developer.

In the image forming apparatus, an image forming method is performed, which includes: a charging step of charging the surface of the image carrier; an electrostatic charge image forming step of forming an electrostatic charge image on the surface of the charged image carrier; a development step of developing, as a toner image, the electrostatic charge image formed on the surface of the image carrier by using the electrostatic charge image developer containing the resin particle according to the exemplary embodiment; a transfer step of transferring the toner image formed on the surface of the image carrier onto the surface of the recording medium; and a fixing step of fixing the toner image transferred on the surface of the recording medium.

As the image forming apparatus, known image forming apparatuses are applied, for example, a direct transfer type apparatus that directly transfers the toner image formed on the surface of the image carrier onto the recording medium, an intermediate transfer type apparatus that primarily transfers the toner image formed on the surface of the image carrier onto the surface of an intermediate transfer body, and secondarily transfers the toner image transferred on the surface of the intermediate transfer body onto the surface of the recording medium, an apparatus including a cleaning unit for cleaning the surface of the image carrier before charging after the transfer of the toner image, and an apparatus including a charge removing unit for removing the charge by irradiating the surface of the image carrier before charging with removing light after the transfer of the toner image.

When the image forming apparatus is an intermediate transfer type apparatus, the transfer unit includes, for example, an intermediate transfer body with a toner image transferred onto the surface thereof, a primary transfer unit for primarily transferring the toner image formed on the surface of the image carrier onto the surface of the intermediate transfer body, and a secondary transfer unit for secondarily transferring the toner image transferred on the surface of the intermediate transfer body onto the surface of the recording medium.

In the image forming apparatus, for example, a portion including the developing unit may have a cartridge structure (process cartridge) that is attached to and detached from the image forming apparatus. As the process cartridge, for example, a process cartridge including a developing unit for storing the electrostatic charge image developer containing the resin particle according to the exemplary embodiment is preferably used.

Hereinafter, an example of the image forming apparatus will be described, but the image forming apparatus is not limited thereto. In the following description, the main parts shown in the drawings will be described, and description of the other parts will be omitted.

Figure 3:
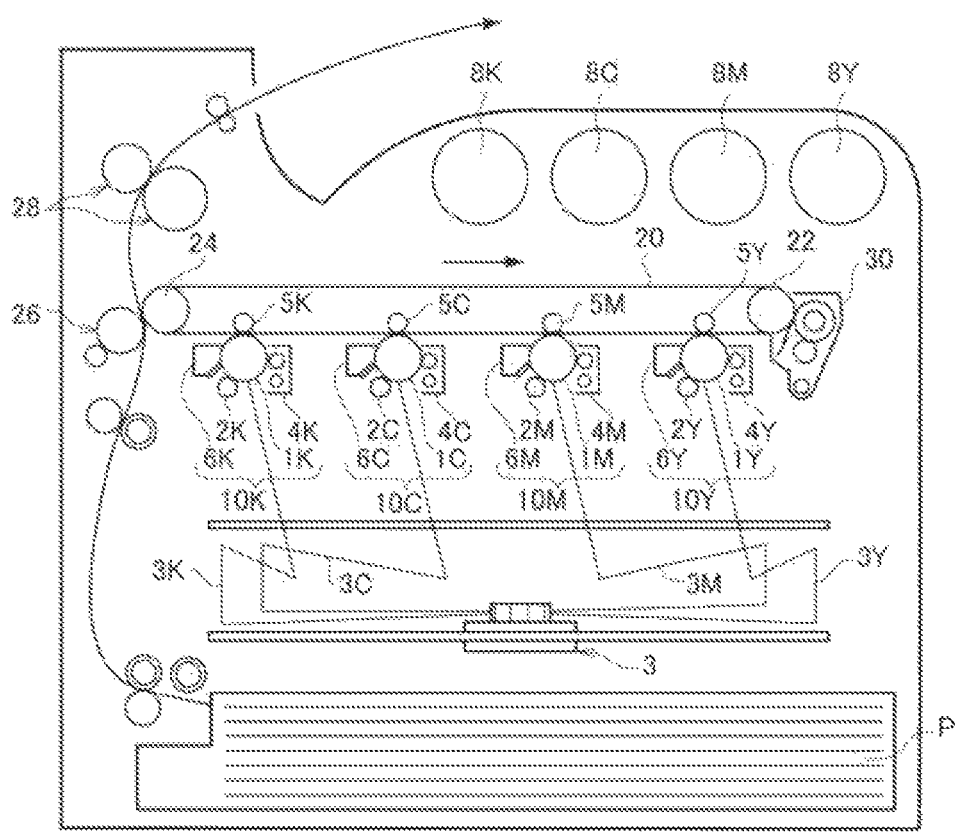
FIG. 3 is a schematic configuration diagram illustrating an image forming apparatus for use in the exemplary embodiment.

FIG. 3 is a schematic configuration diagram illustrating the image forming apparatus for use in the exemplary embodiment.

The image forming apparatus illustrated in FIG. 3 includes first to fourth electrophotographic image forming units 10Y, 10M, 10C, and 10K that output images of respective colors of yellow (Y), magenta (M), cyan (C), and black (K) based on image data subjected to color separation. These image forming units (hereinafter, also simply referred to as "units") 10Y, 10M, 10C, and 10K are arranged side by side in the horizontal direction with a predetermined distance therebetween. These units 10Y, 10M, 10C, and 10K may be process cartridges that are attached to and detached from the image forming apparatus.

Above the units 10Y, 10M, 10C, and 10K, an intermediate transfer belt 20 (an example of the intermediate transfer body) is extended through the units. The intermediate transfer belt 20 is provided around a drive roller 22 and a support roller 24, which are in contact with the inner surface of the intermediate transfer belt 20, and is configured to run in the direction from the first unit 10Y to the fourth unit 10K. A force is applied to the support roller 24 in a direction away from the drive roller 22 by a spring or the like (not illustrated), and tension is applied to the intermediate transfer belt 20 wound around the support roller 24 and the drive roller 22. An intermediate transfer belt cleaning device 30 is provided on an image carrying surface side of the intermediate transfer belt 20 so as to face the drive roller 22.

Developing devices 4Y, 4M, 4C, and 4K (an example of the developing unit) of the units 10Y, 10M, 10C, and 10K are supplied with yellow, magenta, cyan, and black toners stored in toner cartridges 8Y, 8M, 8C, and 8K, respectively.

Since the first to fourth units 10Y, 10M, 10C, and 10K have the same configuration and operation, here, the first unit 10Y, which is arranged on the upstream side in the running direction of the intermediate transfer belt and forms a yellow image, will be described as a representative.

The first unit 10Y includes a photoconductor 1Y functioning as an image carrier. Around the photoconductor 1Y, the following members are disposed in order: a charging roller 2Y (an example of the charging unit) for charging the surface of the photoconductor 1Y to a predetermined potential; an exposure device 3 (an example of the electrostatic charge image forming unit) for forming an electrostatic charge image by exposing the charged surface with a laser beam 3Y based on an image signal subjected to color separation; a developing device 4Y (an example of the developing unit) for developing the electrostatic charge image by supplying the charged toner to the electrostatic charge image; a primary transfer roller 5Y (an example of the primary transfer unit) for transferring the developed toner image onto the intermediate transfer belt 20; and a photoconductor cleaning device 6Y (an example of the image carrier cleaning unit) for removing the toner remaining on the surface of the photoconductor 1Y after the primary transfer.

The primary transfer roller 5Y is disposed inside the intermediate transfer belt 20 and is provided at a position facing the photoconductor 1Y. A bias power source (not illustrated) for applying a primary transfer bias is connected to each of the primary transfer rollers 5Y, 5M, 5C, and 5K of the respective units. Each bias power source changes the value of the transfer bias applied to each primary transfer roller under the control of a controller (not illustrated).

Hereinafter, the operation of forming a yellow image in the first unit 10Y will be described.

First, prior to the operation, the surface of the photoconductor 1Y is charged to a potential of −600 V to −800 V by using the charging roller 2Y.

The photoconductor 1Y is formed by laminating a photoconductive layer on a conductive substrate (e.g., having volume resistivity at 20° C. of $1 \times 10^{-6}$ Ωcm or less). The photoconductive layer generally has high resistance (resistance of general resin), but, has a property that when irradiated with a laser beam, the specific resistance of the portion irradiated with the laser beam changes. Therefore, the exposure device 3 irradiates the charged surface of the photoconductor 1Y with the laser beam 3Y according to yellow image data sent from the controller (not illustrated). Accordingly, an electrostatic charge image having a yellow image pattern is formed on the surface of the photoconductor 1Y.

The electrostatic charge image is an image formed on the surface of the photoconductor 1Y by charging, and is a so-called negative latent image formed by lowering the specific resistance of the portion of the photoconductive layer irradiated with the laser beam 3Y to flow a charge charged on the surface of the photoconductor 1Y and by, on the other hand, leaving a charge of a portion not irradiated with the laser beam 3Y.

The electrostatic charge image formed on the photoconductor 1Y rotates to a predetermined developing position as the photoconductor 1Y runs. Then, at the developing position, the electrostatic charge image on the photoconductor 1Y is developed and visualized as a toner image by the developing device 4Y.

In the developing device 4Y, for example, an electrostatic charge image developer containing at least a yellow toner and a carrier is stored. The yellow toner is frictionally charged by being stirred in the developing device 4Y, and has a charge of the same polarity (negative) as the charge charged on the photoconductor 1Y and is carried on a developer roller (an example of a developer carrier). Then, when the surface of the photoconductor 1Y passes through the developing device 4Y, the yellow toner electrostatically adheres to a discharged latent image portion on the surface of the photoconductor 1Y, and the latent image is developed by the yellow toner. The photoconductor 1Y on which the yellow toner image is formed continues to run at a predetermined speed, and the toner image developed on the photoconductor 1Y is conveyed to a predetermined primary transfer position.

When the yellow toner image on the photoconductor 1Y is conveyed to the primary transfer position, a primary transfer bias is applied to the primary transfer roller 5Y, an electrostatic force from the photoconductor 1Y to the primary transfer roller 5Y acts on the toner image, and the toner image on the photoconductor 1Y is transferred onto the intermediate transfer belt 20. The transfer bias applied at this time has a polarity (+) opposite to the polarity (−) of the toner, and is controlled to, for example, +10 μA by the controller (not illustrated) in the first unit 10Y. The toner remaining on the photoconductor 1Y is removed and collected by the photoconductor cleaning device 6Y.

The primary transfer bias applied to the primary transfer rollers 5M, 5C, and 5K at and after the second unit 10M is also controlled similar to the first unit.

In this way, the intermediate transfer belt 20 onto which the yellow toner image is transferred by the first unit 10Y is sequentially conveyed through the second to fourth units 10M, 10C, and 10K, and the toner images of the respective colors are superimposed and transferred in a multiple manner.

The intermediate transfer belt 20 onto which the toner images of four colors are transferred in a multiple manner through the first to fourth units arrives at a secondary transfer portion including the intermediate transfer belt 20, the support roller 24 in contact with the inner surface of the intermediate transfer belt, and a secondary transfer roller 26 (an example of the secondary transfer unit) disposed on the image carrying surface side of the intermediate transfer belt 20. On the other hand, recording paper P (an example of the recording medium) is fed through a supply mechanism into a gap where the secondary transfer roller 26 and the intermediate transfer belt 20 are in contact with each other at a predetermined timing, and a secondary transfer bias is applied to the support roller 24. The transfer bias applied at this time has the same polarity (−) as the polarity (−) of the toner. The electrostatic force from the intermediate transfer belt 20 to the recording paper P acts on the toner image, and the toner image on the intermediate transfer belt 20 is transferred onto the recording paper P. The secondary transfer bias at this time is determined according to the resistance detected by a resistance detection unit (not illustrated) for detecting the resistance of the secondary transfer portion, and is voltage-controlled.

The recording paper P onto which the toner image is transferred is sent to a pressure contact portion (nip portion) of a pair of fixing rollers in a fixing device 28 (an example of the fixing unit), the toner image is fixed on the recording paper P, and a fixed image is formed. The recording paper P, on which the fixing of the color image is completed, is conveyed out toward a discharge unit, and a series of color image forming operations is completed.

Examples of the recording paper P onto which the toner image is transferred include plain paper for use in electrophotographic copying machines and printers. As the recording medium, in addition to the recording paper P, an OHP sheet or the like may be used. To further improve the smoothness of the image surface after fixing, the surface of the recording paper P is also preferably smooth. For example, coated paper obtained by coating the surface of plain paper with a resin or the like, art paper for printing, and the like are preferably used.

<Process Cartridge and Toner Cartridge>

When the resin particle according to the exemplary embodiment are used as an electrostatic charge image developer, the process cartridge is a process cartridge which includes a developing unit for storing the electrostatic charge image developer containing the resin particle according to the exemplary embodiment and for developing, as a toner image, the electrostatic charge image formed on the surface of the image carrier by using the electrostatic charge image developer, and which is attached to and detached from the image forming apparatus.

The process cartridge may be configured to include a developing unit and, if necessary, at least one selected from other units such as an image carrier, a charging unit, an electrostatic charge image forming unit, and a transfer unit.

Hereinafter, an example of the process cartridge will be shown, but the process cartridge is not limited thereto. In the following description, the main parts shown in the drawings will be described, and description of the other parts will be omitted.

Figure 4:
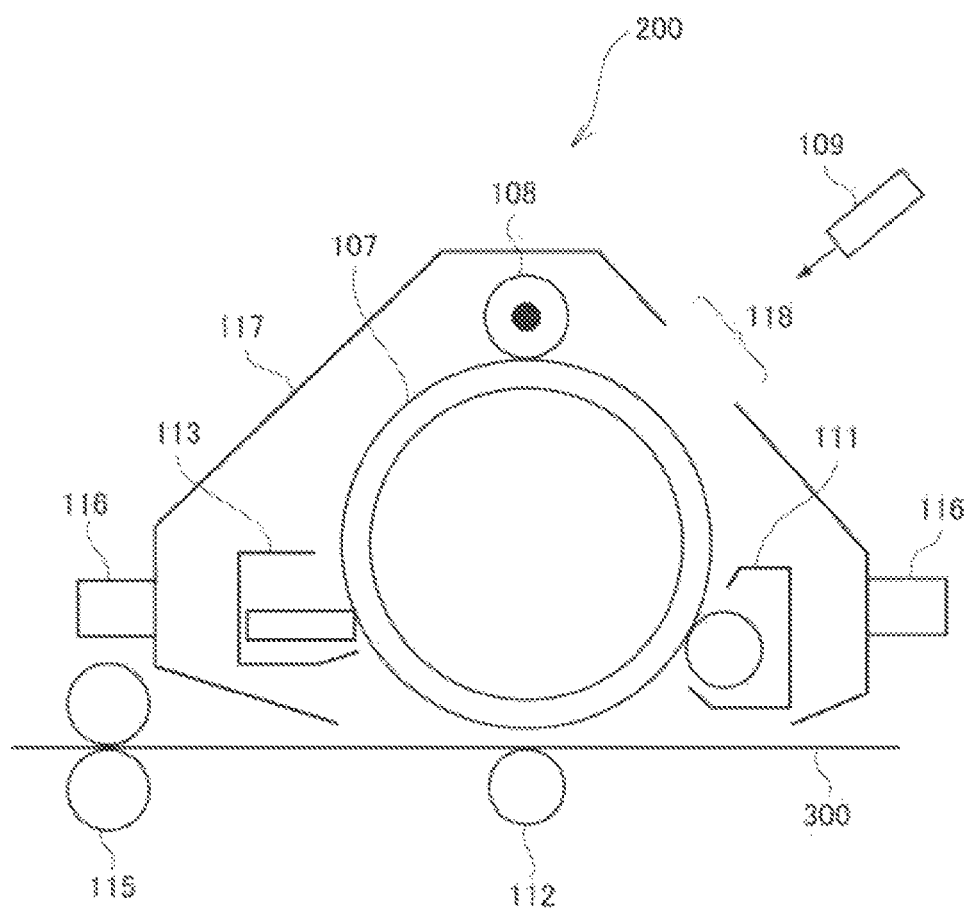
FIG. 4 is a schematic configuration diagram illustrating a process cartridge for use in the exemplary embodiment.

FIG. 4 is a schematic configuration diagram illustrating an example of the process cartridge for use in the exemplary embodiment.

A process cartridge 200 illustrated in FIG. 4 is configured as a cartridge by, for example, integrally combining and holding a photoconductor 107 (an example of the image carrier), a charging roller 108 (an example of the charging unit) provided around the photoconductor 107, a developing device 111 (an example of the developing unit), and a photoconductor cleaning device 113 (an example of the cleaning unit) by a housing 117 provided with a mounting rail 116 and an opening 118 for exposure.

In FIG. 4, 109 denotes an exposure device (an example of the electrostatic charge image forming unit), 112 denotes a transfer device (an example of the transfer unit), 115 denotes a fixing device (an example of the fixing unit), and 300 denotes recording paper (an example of the recording medium).

Next, the toner cartridge will be described.

The toner cartridge is a toner cartridge for storing the resin particle according to the exemplary embodiment as an electrostatic charge image developing toner and attached to and detached from the image forming apparatus. The toner cartridge includes a replenishment toner for supplying the toner to the developing unit provided in the image forming apparatus.

The image forming apparatus illustrated in FIG. 3 is an image forming apparatus having a configuration in which the toner cartridges 8Y, 8M, 8C, 8K are attached and detached. The developing devices 4Y, 4M, 4C, and 4K are connected to the toner cartridges corresponding to the respective colors by a toner supply pipe (not illustrated). When the toner stored in the toner cartridge is used up, the toner cartridge is replaced.

EXAMPLES

Hereinafter, Examples of the present invention will be described, but the present invention is not limited to the following Examples. In the following description, all "parts" and "%" are based on mass unless otherwise specified.

The sea-island structure in the toner particles is confirmed by the method described above.

Example 1

<Preparation of Fluorescent Colorant A-containing Particles (1)>

Polyester resin (Fine Dick M-8020 manufactured by DIC CORPORATION): 45 parts
Blocked isocyanate (VESTAGON BF1358, manufactured by Evonik Industries): 45 parts
Fluorescent dye (Basic Red 1:1, Rhodamine 6GCP-N manufactured by Taoka Chemical Co., Ltd.): 10 parts The above components are mixed by heating at 170° C. for 2 hours, roughly crushed with a Banbury mixer, and further crushed with a crusher AFG100 (manufactured by Hosokawa Micron Corporation) to 1.9 µm, to obtain polyester polyurethane resin colored particles (fluorescent colorant A-containing particles (1)).

<Preparation of Fluorescent Colorant A-Containing Particle Dispersion Liquid (1)>
  Fluorescent colorant A-containing particles (1): 200 parts
  Surfactant (Neogen RK manufactured by DKS Co. Ltd.): 15 parts (solid content concentration 20%)
  Pure water: 785 parts The above materials are mixed, and a fluorescent colorant A-containing particle dispersion liquid (1) (solid content concentration 20%) is prepared by Ultra Turrax.

<Preparation of Colorant B Particle Dispersion Liquid (1)>
  Magenta pigment (FASTOGEN SUPER MAGENTA R): 70 parts
  Anionic surfactant (Neogen RK manufactured by DKS Co. Ltd.): 30 parts (solid content concentration 20%)
  Ion-exchanged water: 200 parts The above materials are mixed and dispersed for 10 minutes using a homogenizer (Ultra Turrax T50 manufactured by IKA Company). Ion-exchanged water is added to make the amount of the solid content in the dispersion liquid be 20 mass %, to obtain a colorant B particle dispersion liquid (1) in which colorant particles having a volume average particle diameter of 140 nm are dispersed.

<Preparation of Resin Particle Dispersion Liquid (1)>
  Terephthalic acid: 30 parts by mole
  Fumaric acid: 70 parts by mole
  Bisphenol A ethylene oxide adduct: 5 parts by mole
  Bisphenol A propylene oxide adduct: 95 parts by mole To a flask equipped with a stirrer, a nitrogen inlet tube, a temperature sensor, and a rectification column, the above materials are charged, the temperature is raised to 220° C. over 1 hour, and 1 part of titanium tetraethoxide is added with respect to 100 parts of the above materials. The temperature is raised to 230° C. over 30 minutes while distilling off the produced water, the dehydration condensation reaction is continued at 230° C. for 1 hour, and then the reaction product is cooled. Thus, a polyester resin having a weight average molecular weight of 18,000 and a glass transition temperature of 60° C. is obtained.

To a container equipped with a temperature control unit and a nitrogen replacement unit, 40 parts of ethyl acetate and 25 parts of 2-butanol are charged to prepare a mixed solvent. Then, 100 parts of the polyester resin is gradually charged and dissolved therein, and a 10 mass % aqueous ammonia solution (amount equivalent to 3 times the acid value of the resin in a molar ratio) is charged and stirred for 30 minutes. Next, the inside of the container is replaced with dry nitrogen, the temperature is maintained at 40° C., and 400 parts of ion-exchanged water is added dropwise at a rate of 2 parts/min while stirring the mixed liquid. After the completion of the dropping, the temperature is returned to room temperature (20° C. to 25° C.), and bubbling is performed with dry nitrogen for 48 hours while stirring, to obtain a resin particle dispersion liquid in which ethyl acetate and 2-butanol are reduced to 1,000 ppm or less. Ion-exchanged water is added to the resin particle dispersion liquid to adjust the solid content to 20 mass % to obtain a resin particle dispersion liquid (1).

<Preparation of Release Agent Particle Dispersion Liquid (1)>
  Paraffin wax (HNP-9 manufactured by Nippon Seiro Co., Ltd.): 100 parts
  Anionic surfactant (Neogen RK manufactured by DKS Co. Ltd.): 1 part
  Ion-exchanged water: 350 parts The above materials are mixed, heated to 100° C., and dispersed using a homogenizer (trade name: Ultra Turrax T50, manufactured by IKA Company), and then a dispersion treatment is performed using a Manton-Gaulin high-pressure homogenizer manufactured by Gaulin Company, to obtain a release agent particle dispersion liquid (1) (solid content 20 mass %) in which release agent particles having a volume average particle diameter of 200 nm are dispersed.

<Preparation of Toner Particles (1)>
  Resin particle dispersion liquid (1): 241 parts
  Fluorescent colorant A-containing particle dispersion liquid (1): 175 parts
  Colorant B particle dispersion liquid (1): 9 parts
  Release agent particle dispersion liquid (1): 25 parts
  Anionic surfactant (Neogen RK manufactured by DKS Co. Ltd., 20%): 10 parts The above materials are charged into a round stainless steel flask, 0.1 N(=mol/L) nitric acid is added to adjust the pH to 3.5, and then 30 parts of a nitric acid aqueous solution having a polyaluminum chloride concentration of 10 mass % is added thereto. Next, the mixture is dispersed at a liquid temperature of 30° C. using a homogenizer (trade name: Ultra Turrax T50, manufactured by IKA Company), and then heated to 45° C. in a heating oil bath and kept for 30 minutes. Thereafter, 50 parts of the resin particle dispersion liquid (1) is added and kept for 1 hour, a 0.1 N sodium hydroxide aqueous solution is added to adjust the pH to 8.5, and then the mixture is heated to 84° C. and kept for 2.5 hours. Then, the mixture is cooled to 20° C. at a rate of 20° C./min, the solid content is filtered off, thoroughly washed with ion-exchanged water, and dried to obtain toner particles (1). The volume average particle diameter of the toner particles (1) is 5.8 µm.

<Preparation of Carrier 1>
  Ferrite particles (average particle diameter 35 µm): 100 parts
  Toluene: 14 parts
  Polymethylmethacrylate (MMA, weight average molecular weight 75,000): 5 parts
  Carbon black: 0.2 part (VXC-72, manufactured by Cabot Corporation, volume resistivity: 100 Ωcm or less)

The above materials excluding ferrite particles are dispersed in a sand mill to prepare a dispersion liquid, and the dispersion liquid together with ferrite particles is charged into a vacuum degassing kneader and dried under reduced pressure with stirring, to obtain a carrier 1.

<Preparation of Toner>
To 100 parts by mass of the obtained toner particles (1), 1.5 parts by mass of hydrophobic silica (RY50, manufactured by NIPPON AEROSIL CO., LTD.) and 1.0 part by mass of hydrophobic titanium oxide (T805, manufactured by NIPPON AEROSIL CO., LTD.) are mixed and blended for 30 seconds at 10,000 rpm (revolutions per minute) using a sample mill. Thereafter, the mixture is sieved with a vibrating sieve having an opening of 45 µm to prepare a toner 1 (electrostatic charge image developing toner). The volume average particle diameter of the obtained toner 1 is 5.8 µm.

<Preparation of Electrostatic Charge Image Developer>
With a V blender, 8 parts of the toner and 92 parts of the carrier are mixed to prepare a developer 1 (electrostatic charge image developer).

Example 2

<Preparation of Fluorescent Colorant A-containing Particles (2)>
  Terephthalic acid: 30 parts by mole
  Fumaric acid: 70 parts by mole
  Bisphenol A ethylene oxide adduct: 5 parts by mole Bisphenol A propylene oxide adduct: 95 parts by mole To a flask equipped with a stirrer, a nitrogen inlet tube, a temperature sensor, and a rectification column, the above materials are charged, the temperature is raised to 220° C. over 1 hour, and 1 part of titanium tetraethoxide is added with respect to 100 parts of the above materials. The temperature is raised to 230° C. over 30 minutes while distilling off the produced water, the dehydration condensation reaction is continued at 230° C. for 1 hour, and then the reaction product is cooled. Thus, a polyester resin having a weight average molecular weight of 18,000 and a glass transition temperature of 60° C. is obtained.

The above polyester resin: 93 parts
Fluorescent dye (Basic Red 1:1, Rhodamine 6GCP-N manufactured by Taoka Chemical Co., Ltd.): 7 parts The above components are mixed by heating at 170° C. for 2 hours, roughly crushed with a Banbury mixer, and further crushed with a crusher AFG100 (manufactured by Hosokawa Micron Corporation) to 1.0 μm, to obtain polyester polyurethane resin colored particles (fluorescent colorant A-containing particles (2)).

<Preparation of Fluorescent Colorant A-Containing Particle Dispersion Liquid (2)>

Fluorescent colorant A-containing particles (2): 200 parts
Surfactant (Neogen RK manufactured by DKS Co. Ltd.): 15 parts (solid content concentration 20%)
Pure water: 785 parts The above components are mixed and crushed to 0.2 μm with a continuous key mill KMC-3 to prepare a fluorescent colorant A-containing particle dispersion liquid (2) (solid content concentration 20%).

<Preparation of Colorant B-Containing Particles (2)>

Polyester resin (Fine Dick M-8020 manufactured by DIC CORPORATION): 47.5 parts
Blocked isocyanate (VESTAGON BF1358, manufactured by Evonik Industries): 47.5 parts
Magenta pigment (FASTOGEN SUPER MAGENTA R): 5 parts The above components are mixed by heating at 170° C. for 2 hours, roughly crushed with a Banbury mixer, and further crushed with a crusher AFG100 (manufactured by Hosokawa Micron Corporation) to 1.9 μm, to obtain polyester polyurethane resin colored particles (colorant B-containing particles (2)).

<Preparation of Colorant B-Containing Particle Dispersion Liquid (2)>

Colorant B-containing particles (2): 200 parts
Surfactant (Neogen RK manufactured by DKS Co. Ltd.): 15 parts (solid content concentration 20%)
Pure water: 785 parts The above components are mixed, and a colorant B-containing particle dispersion liquid (2) (solid content concentration 20%) is prepared by Ultra Turrax.

<Preparation of Toner Particles (2)>

Fluorescent colorant A-containing particle dispersion liquid (2): 250 parts
Colorant B particle dispersion liquid (2): 175 parts
Release agent particle dispersion liquid (1): 25 parts
Anionic surfactant (Neogen RK manufactured by DKS Co. Ltd., 20%): 10 parts The above materials are charged into a round stainless steel flask, 0.1 N(=mol/L) nitric acid is added to adjust the pH to 3.5, and then 30 parts of a nitric acid aqueous solution having a polyaluminum chloride concentration of 10 mass % is added thereto. Next, the mixture is dispersed at a liquid temperature of 30° C. using a homogenizer (trade name: Ultra Turrax T50, manufactured by IKA Company), and then heated to 45° C. in a heating oil bath and kept for 30 minutes. Thereafter, 50 parts of the resin particle dispersion liquid (1) is added and kept for 1 hour, a 0.1 N sodium hydroxide aqueous solution is added to adjust the pH to 8.5, and then the mixture is heated to 84° C. and kept for 2.5 hours. Then, the mixture is cooled to 20° C. at a rate of 20° C./min, the solid content is filtered off, thoroughly washed with ion-exchanged water, and dried to obtain toner particles (2). The volume average particle diameter of the toner particles (2) is 5.8 μm.

An electrostatic charge image developing toner and an electrostatic charge image developer are prepared in the same manner as in Example 1 except that the toner particles (2) are used instead of the toner particles (1).

Example 3

An electrostatic charge image developing toner and an electrostatic charge image developer are prepared in the same manner as in Example 1 except that the pigment of the colorant in Example 1 is changed to PR202 (Cinquasia Magenta L 4530, manufactured by BASF) in Example 3.

Example 4

An electrostatic charge image developing toner and an electrostatic charge image developer are prepared in the same manner as in Example 2 except that the pigment of the colorant in Example 2 is changed to PR202 (Cinquasia Magenta L 4530, manufactured by BASF) in Example 4.

Example 5

An electrostatic charge image developing toner and an electrostatic charge image developer are prepared in the same manner as in Example 1 except that the pigment of the colorant in Example 1 is changed to PR282 (Cinquasia Magenta L 4400, manufactured by BASF) in Example 5.

Example 6

An electrostatic charge image developing toner and an electrostatic charge image developer are prepared in the same manner as in Example 2 except that the pigment of the colorant in Example 2 is changed to PR282 (Cinquasia Magenta L 4400, manufactured by BASF) in Example 6.

Example 7

An electrostatic charge image developing toner and an electrostatic charge image developer are prepared in the same manner as in Example 1 except that the pigment of the colorant in Example 1 is changed to a PR122/PV19 solid solution pigment (FASTOGEN SUPER MAGENTA RE-05, manufactured by DIC CORPORATION) in Example 7.

Example 8

An electrostatic charge image developing toner and an electrostatic charge image developer are prepared in the same manner as in Example 2 except that the pigment of the colorant in Example 2 is changed to a PR122/PV19 solid solution pigment (FASTOGEN SUPER MAGENTA RE-05, manufactured by DIC CORPORATION) in Example 8.

Example 9

An electrostatic charge image developing toner and an electrostatic charge image developer are prepared in the same manner as in Example 1 except that the pigment of the colorant in Example 1 is changed to PR238 (Permanent Carmine FSB, manufactured by Clariant Ltd.) in Example 9.

Example 10

An electrostatic charge image developing toner and an electrostatic charge image developer are prepared in the same manner as in Example 2 except that the pigment of the colorant in Example 2 is changed to PR238 (Permanent Carmine FSB, manufactured by Clariant Ltd.) in Example 10.

Example 11

An electrostatic charge image developing toner and an electrostatic charge image developer are prepared in the same manner as in Example 1 except that the pigment of the colorant in Example 1 is changed to PR269 (Pigment Red 269, manufactured by TOKYO SHIKIZAI INDUSTRY Co., Ltd.) in Example 11.

Example 12

An electrostatic charge image developing toner and an electrostatic charge image developer are prepared in the same manner as in Example 2 except that the pigment of the colorant in Example 2 is changed to PR269 (Pigment Red 269, manufactured by TOKYO SHIKIZAI INDUSTRY Co., Ltd.) in Example 12.

Example 13

An electrostatic charge image developing toner and an electrostatic charge image developer are prepared in the same manner as in Example 1 except that the pigment of the colorant in Example 1 is changed to PR169 (Fanal Pink D 4810, manufactured by BASF) in Example 13.

Example 14

An electrostatic charge image developing toner and an electrostatic charge image developer are prepared in the same manner as in Example 2 except that the pigment of the colorant in Example 2 is changed to PR169 (Fanal Pink D 4810, manufactured by BASF) in Example 14.

Example 15

An electrostatic charge image developing toner and an electrostatic charge image developer are prepared in the same manner as in Example 1 except that the pigment of the colorant in Example 1 is changed to PR81:2 (Fanal Pink D 4830, manufactured by BASF) in Example 15.

Example 16

An electrostatic charge image developing toner and an electrostatic charge image developer are prepared in the same manner as in Example 2 except that the pigment of the colorant in Example 2 is changed to PR81:2 (Fanal Pink D 4830, manufactured by BASF) in Example 16.

Example 17

An electrostatic charge image developing toner and an electrostatic charge image developer are prepared in the same manner as in Example 1 except that, in Example 17, the concentration of the fluorescent colorant is adjusted to the composition in Table 2 by the method in Example 1.

Example 18

An electrostatic charge image developing toner and an electrostatic charge image developer are prepared in the same manner as in Example 2 except that, in Example 18, the concentration of the fluorescent colorant is adjusted to the composition in Table 2 by the method in Example 2.

Example 19

An electrostatic charge image developing toner and an electrostatic charge image developer are prepared in the same manner as in Example 1 except that, in Example 19, the concentration of the fluorescent colorant is adjusted to the composition in Table 2 by the method in Example 1.

Example 20

An electrostatic charge image developing toner and an electrostatic charge image developer are prepared in the same manner as in Example 2 except that, in Example 20, the concentration of the fluorescent colorant is adjusted to the composition in Table 2 by the method in Example 2.

Example 21

An electrostatic charge image developing toner and an electrostatic charge image developer are prepared in the same manner as in Example 1 except that, in Example 21, the concentration of the colorant is adjusted to the composition in Table 3 by the method in Example 1.

Example 22

An electrostatic charge image developing toner and an electrostatic charge image developer are prepared in the same manner as in Example 2 except that, in Example 22, the concentration of the colorant is adjusted to the composition in Table 3 by the method in Example 2.

Example 23

An electrostatic charge image developing toner and an electrostatic charge image developer are prepared in the same manner as in Example 1 except that, in Example 23, the concentration of the colorant is adjusted to the composition in Table 3 by the method in Example 1.

Example 24

An electrostatic charge image developing toner and an electrostatic charge image developer are prepared in the same manner as in Example 2 except that, in Example 24, the concentration of the colorant is adjusted to the composition in Table 3 by the method in Example 2.

Example 25

An electrostatic charge image developing toner and an electrostatic charge image developer are prepared in the same manner as in Example 1 except that, in Example 25, the concentrations of the fluorescent colorant and the colorant are adjusted to the composition in Table 3 by the method in Example 1.

Example 26

An electrostatic charge image developing toner and an electrostatic charge image developer are prepared in the same manner as in Example 2 except that, in Example 26, the concentrations of the fluorescent colorant and the colorant are adjusted to the composition in Table 3 by the method in Example 2.

Example 27

An electrostatic charge image developing toner and an electrostatic charge image developer are prepared in the same manner as in Example 25 except that the fluorescent colorant in Example 25 is changed to Basic Violet 11:1 (Rhodamine A, manufactured by Taoka Chemical Co., Ltd.) in Example 27.

Example 28

An electrostatic charge image developing toner and an electrostatic charge image developer are prepared in the same manner as in Example 26 except that the fluorescent colorant in Example 26 is changed to Basic Violet 11:1 (Rhodamine A, manufactured by Taoka Chemical Co., Ltd.) in Example 28.

Example 29

An electrostatic charge image developing toner and an electrostatic charge image developer are prepared in the same manner as in Example 25 except that the fluorescent colorant in Example 25 is changed to Basic Violet 11:1 (Rhodamine A, manufactured by Taoka Chemical Co., Ltd.) and the colorant in Example 25 is changed to PR202 (Cinquasia Magenta L 4530, manufactured by BASF) in Example 29.

Example 30

An electrostatic charge image developing toner and an electrostatic charge image developer are prepared in the same manner as in Example 26 except that the fluorescent colorant in Example 26 is changed to Basic Violet 11:1 (Rhodamine A, manufactured by Taoka Chemical Co., Ltd.) and the colorant in Example 26 is changed to PR202 (Cinquasia Magenta L 4530, manufactured by BASF) in Example 30.

Example 31

An electrostatic charge image developing toner and an electrostatic charge image developer are prepared in the same manner as in Example 25 except that the fluorescent colorant in Example 25 is changed to Basic Violet 11:1 (Rhodamine A, manufactured by Taoka Chemical Co., Ltd.) and the colorant in Example 25 is changed to PR282 (Cinquasia Magenta L 4400, manufactured by BASF) in Example 31.

Example 32

An electrostatic charge image developing toner and an electrostatic charge image developer are prepared in the same manner as in Example 26 except that the fluorescent colorant in Example 26 is changed to Basic Violet 11:1 (Rhodamine A, manufactured by Taoka Chemical Co., Ltd.) and the colorant in Example 26 is changed to PR282 (Cinquasia Magenta L 4400, manufactured by BASF) in Example 32.

Example 33

An electrostatic charge image developing toner and an electrostatic charge image developer are prepared in the same manner as in Example 25 except that the fluorescent colorant in Example 25 is changed to Basic Violet 11:1 (Rhodamine A, manufactured by Taoka Chemical Co., Ltd.) and the colorant in Example 25 is changed to a PR122/PV19 solid solution pigment (FASTOGEN SUPER MAGENTA RE-05, manufactured by DIC CORPORATION) in Example 33.

Example 34

An electrostatic charge image developing toner and an electrostatic charge image developer are prepared in the same manner as in Example 26 except that the fluorescent colorant in Example 26 is changed to Basic Violet 11:1 (Rhodamine A, manufactured by Taoka Chemical Co., Ltd.) and the colorant in Example 26 is changed to a PR122/PV19 solid solution pigment (FASTOGEN SUPER MAGENTA RE-05, manufactured by DIC CORPORATION) in Example 34.

Example 35

An electrostatic charge image developing toner and an electrostatic charge image developer are prepared in the same manner as in Example 25 except that the fluorescent colorant in Example 25 is changed to Basic Violet 11:1 (Rhodamine A, manufactured by Taoka Chemical Co., Ltd.) and the colorant in Example 25 is changed to PR238 (Permanent Carmine FSB, manufactured by Clariant Ltd.) in Example 35.

Example 36

An electrostatic charge image developing toner and an electrostatic charge image developer are prepared in the same manner as in Example 26 except that the fluorescent colorant in Example 26 is changed to Basic Violet 11:1 (Rhodamine A, manufactured by Taoka Chemical Co., Ltd.) and the colorant in Example 26 is changed to PR238 (Permanent Carmine FSB, manufactured by Clariant Ltd.) in Example 36.

Example 37

An electrostatic charge image developing toner and an electrostatic charge image developer are prepared in the same manner as in Example 25 except that the fluorescent colorant in Example 25 is changed to Basic Violet 11:1 (Rhodamine A, manufactured by Taoka Chemical Co., Ltd.) and the colorant in Example 25 is changed to PR269 (Pigment Red 269, manufactured by TOKYO SHIKIZAI INDUSTRY Co., Ltd.) in Example 37.

Example 38

An electrostatic charge image developing toner and an electrostatic charge image developer are prepared in the same manner as in Example 26 except that the fluorescent colorant in Example 26 is changed to Basic Violet 11:1 (Rhodamine A, manufactured by Taoka Chemical Co., Ltd.) and the colorant in Example 26 is changed to PR269 (Pigment Red 269, manufactured by TOKYO SHIKIZAI INDUSTRY Co., Ltd.) in Example 38.

Example 39

An electrostatic charge image developing toner and an electrostatic charge image developer are prepared in the same manner as in Example 25 except that the fluorescent colorant in Example 25 is changed to Basic Violet 11:1 (Rhodamine A, manufactured by Taoka Chemical Co., Ltd.) and the colorant in Example 25 is changed to PR169 (Fanal Pink D 4810, manufactured by BASF) in Example 39.

Example 40

An electrostatic charge image developing toner and an electrostatic charge image developer are prepared in the same manner as in Example 26 except that the fluorescent colorant in Example 26 is changed to Basic Violet 11:1 (Rhodamine A, manufactured by Taoka Chemical Co., Ltd.) and the colorant in Example 26 is changed to PR169 (Fanal Pink D 4810, manufactured by BASF) in Example 40.

Example 41

An electrostatic charge image developing toner and an electrostatic charge image developer are prepared in the same manner as in Example 25 except that the fluorescent colorant in Example 25 is changed to Basic Violet 11:1 (Rhodamine A, manufactured by Taoka Chemical Co., Ltd.) and the colorant in Example 25 is changed to PR81:2 (Fanal Pink D 4830, manufactured by BASF) in Example 41.

Example 42

An electrostatic charge image developing toner and an electrostatic charge image developer are prepared in the same manner as in Example 26 except that the fluorescent colorant in Example 26 is changed to Basic Violet 11:1 (Rhodamine A, manufactured by Taoka Chemical Co., Ltd.) and the colorant in Example 26 is changed to PR81:2 (Fanal Pink D 4830, manufactured by BASF) in Example 42.

Example 43

An electrostatic charge image developing toner and an electrostatic charge image developer are prepared in the same manner as in Example 33 except that the fluorescent colorant in Example 33 is changed to Basic Red 1 (Rhodamine 6GCP, manufactured by Taoka Chemical Co., Ltd.) in Example 43.

Example 44

An electrostatic charge image developing toner and an electrostatic charge image developer are prepared in the same manner as in Example 34 except that the fluorescent colorant in Example 34 is changed to Basic Red 1 (Rhodamine 6GCP, manufactured by Taoka Chemical Co., Ltd.) in Example 44.

Example 45

An electrostatic charge image developing toner and an electrostatic charge image developer are prepared in the same manner as in Example 33 except that the fluorescent colorant in Example 33 is changed to Basic Violet 10 (Rhodamine B gran, manufactured by Taoka Chemical Co., Ltd.) in Example 45.

Example 46

An electrostatic charge image developing toner and an electrostatic charge image developer are prepared in the same manner as in Example 34 except that the fluorescent colorant in Example 34 is changed to Basic Violet 10 (Rhodamine B gran, manufactured by Taoka Chemical Co., Ltd.) in Example 46.

Example 47

An electrostatic charge image developing toner and an electrostatic charge image developer are prepared in the same manner as in Example 33 except that the fluorescent colorant in Example 33 is changed to Solvent Red 49 (Rhodamine B base, manufactured by Taoka Chemical Co., Ltd.) in Example 47.

Example 48

An electrostatic charge image developing toner and an electrostatic charge image developer are prepared in the same manner as in Example 34 except that the fluorescent colorant in Example 34 is changed to Solvent Red 49 (Rhodamine B base, manufactured by Taoka Chemical Co., Ltd.) in Example 48.

Example 49

An electrostatic charge image developing toner and an electrostatic charge image developer are prepared in the same manner as in Example 25 except that the fluorescent colorant in Example 25 is changed to Basic Yellow 40 (Neeliglow Yellow 40, manufactured by Neelikon Food Dyes And Chemicals) and the colorant in Example 25 is changed to PY74 (HANSA BRILLIANT YELLOW 2GX 70, manufactured by Clariant Ltd.) in Example 49.

Example 50

An electrostatic charge image developing toner and an electrostatic charge image developer are prepared in the same manner as in Example 26 except that the fluorescent colorant in Example 26 is changed to Basic Yellow 40 (Neeliglow Yellow 40, manufactured by Neelikon Food Dyes And Chemicals) and the colorant in Example 26 is changed to PY74 (HANSA BRILLIANT YELLOW 2GX 70, manufactured by Clariant Ltd.) in Example 50.

Example 51

An electrostatic charge image developing toner and an electrostatic charge image developer are prepared in the same manner as in Example 25 except that the fluorescent colorant in Example 25 is changed to Solvent Green 7 (Needlink Green 7, manufactured by Neelikon Food Dyes And Chemicals) and the colorant in Example 25 is changed to PG36 (FASTOGEN GREEN 2YK, manufactured by DIC CORPORATION) in Example 51.

Example 52

An electrostatic charge image developing toner and an electrostatic charge image developer are prepared in the same manner as in Example 26 except that the fluorescent colorant in Example 26 is changed to Solvent Green 7 (Needlink Green 7, manufactured by Neelikon Food Dyes And Chemicals) and the colorant in Example 26 is changed to PG36 (FASTOGEN GREEN 2YK, manufactured by DIC CORPORATION) in Example 52.

Example 53

An electrostatic charge image developing toner and an electrostatic charge image developer are prepared in the same manner as in Example 25 except that the fluorescent colorant in Example 25 is changed to Solvent Orange 63 (Neelglow Orange 63, manufactured by Neelikon Food Dyes And Chemicals) and the colorant in Example 25 is changed to PO43 (Hostaperm Orange GR, manufactured by Clariant Ltd.) in Example 53.

Example 54

An electrostatic charge image developing toner and an electrostatic charge image developer are prepared in the same manner as in Example 26 except that the fluorescent colorant in Example 26 is changed to Solvent Orange 63 (Neelglow Orange 63, manufactured by Neelikon Food Dyes And Chemicals) and the colorant in Example 26 is changed to PO43 (Hostaperm Orange GR, manufactured by Clariant Ltd.) in Example 54.

Example 55

An electrostatic charge image developing toner and an electrostatic charge image developer are prepared in the same manner as in Example 25 except that the fluorescent colorant particles in Example 25 are crushed to 1.4 µm in Example 55.

Example 56

An electrostatic charge image developing toner and an electrostatic charge image developer are prepared in the same manner as in Example 25 except that the colorant particles in Example 25 are crushed to 1.4 µm in Example 56.

Example 57

An electrostatic charge image developing toner and an electrostatic charge image developer are prepared in the same manner as in Example 25 except that the fluorescent colorant particles in Example 25 are crushed to 2.5 µm in Example 57.

Example 58

An electrostatic charge image developing toner and an electrostatic charge image developer are prepared in the same manner as in Example 25 except that the colorant particles in Example 25 are crushed to 2.5 µm in Example 58.

Example 59

<Preparation of Styrene Acrylic Resin Particle Dispersion Liquid (1)>
Styrene (manufactured by Wako Pure Chemical Company): 65.0 parts
n-butyl acrylate (manufactured by Wako Pure Chemical Company): 30.0 parts
Surfactant (Neogen RK manufactured by DKS Co. Ltd.): 1.0 part
Polymerization initiator (ammonium persulfate): 1.0 part
DIW: 400 parts The above materials are mixed in a flask and emulsified for 10 minutes using a homogenizer (Ultra Turrax T50 manufactured by IKA Company). Next, the flask is replaced with nitrogen, then the solution in the flask is heated with stirring in a water bath until the temperature reaches 85° C., followed by emulsion polymerization for 5 hours, and then cooled until the temperature reaches 30° C., to obtain a styrene acrylic resin particle dispersion liquid (1) having a solid content concentration of 20% and a volume average particle diameter of 180 nm.

<Preparation of Fluorescent Colorant A-containing Particles (59)>
Dried product of the above acrylic resin after removing impurities with a dialysis membrane: 45 parts
Blocked isocyanate (VESTAGON BF1358, manufactured by Evonik Industries): 45 parts
Fluorescent dye (Basic Red 1:1, Rhodamine 6GCP-N manufactured by Taoka Chemical Co., Ltd.): 10 parts The above components are mixed by heating at 170° C. for 2 hours, roughly crushed with a Banbury mixer, and further crushed with a crusher AFG100 (manufactured by Hosokawa Micron Corporation) to 1.8 µm, to obtain polyester polyurethane resin colored particles (fluorescent colorant A-containing particles (59)).

<Preparation of Fluorescent Colorant A-Containing Particle Dispersion Liquid (59)>
Fluorescent colorant A-containing particles (59): 200 parts
Surfactant (Neogen RK manufactured by DKS Co. Ltd.): 15 parts (solid content concentration 20%)
Pure water: 785 parts The above components are mixed, and a fluorescent colorant A-containing particle dispersion liquid (59) (solid content concentration 20%) is prepared by Ultra Turrax.

<Preparation of Toner Particles (59)>
Styrene acrylic resin particle dispersion liquid (1): 346 parts
Fluorescent colorant A-containing particle dispersion liquid (59): 75 parts
Colorant B particle dispersion liquid (1): 4 parts
Release agent particle dispersion liquid (1): 25 parts
Anionic surfactant (Neogen RK manufactured by DKS Co. Ltd., 20%): 10 parts The above materials are charged into a round stainless steel flask, 0.1 N(=mol/L) nitric acid is added to adjust the pH to 3.5, and then 30 parts of a nitric acid aqueous solution having a polyaluminum chloride concentration of 10 mass % is added thereto. Next, the mixture is dispersed at a liquid temperature of 30° C. using a homogenizer (trade name: Ultra Turrax T50, manufactured by IKA Company), and then heated to 45° C. in a heating oil bath and kept for 30 minutes. Thereafter, 50 parts of the styrene acrylic resin particle dispersion liquid (1) is added and kept for 1 hour, a 0.1 N sodium hydroxide aqueous solution is added to adjust the pH to 8.5, and then the mixture is heated to 84° C. and kept for 2.5 hours. Then, the mixture is cooled to 20° C. at a rate of 20° C./min, the solid content is filtered off, thoroughly washed with ion-exchanged water, and dried to obtain toner particles (59). The volume average particle diameter of the toner particles (59) is 5.8 µm.

An electrostatic charge image developing toner and an electrostatic charge image developer are prepared in the same manner as in Example 1 except that the toner particles (59) are used instead of the toner particles (1).

Example 60

<Preparation of Fluorescent Colorant A-Containing Particles (60)>
Styrene (manufactured by Wako Pure Chemical Company): 65.0 parts
n-butyl acrylate (manufactured by Wako Pure Chemical Company): 30.0 parts
Surfactant (Neogen RK manufactured by DKS Co. Ltd.): 1.0 part
Polymerization initiator (ammonium persulfate): 1.0 part
DIW: 400 parts The above materials are mixed in a flask and emulsified for 10 minutes using a homogenizer (Ultra Turrax T50 manufactured by IKA Company). Next, the flask is replaced with nitrogen, then the solution in the flask is heated with stirring in a water bath until the temperature reaches 85° C., followed by emulsion polymerization for 5 hours, and then cooled until the temperature reaches 30° C., to obtain a styrene acrylic resin particle dispersion liquid (1) having a solid content concentration of 20% and a volume average particle diameter of 180 nm.

Dried product of the styrene acrylic resin particle dispersion liquid (1) after removing impurities with a dialysis membrane: 98.22 parts
Fluorescent dye (Basic Red 1:1, Rhodamine 6GCP-N manufactured by Taoka Chemical Co., Ltd.): 1.78 parts The above components are mixed by heating at 170° C. for 2 hours, roughly crushed with a Banbury mixer, and further crushed with a crusher AFG100 (manufactured by Hosokawa Micron Corporation) to 1.0 µm, to obtain polyester polyurethane resin colored particles (fluorescent colorant A-containing particles (60)).

<Preparation of Fluorescent Colorant A-Containing Particle Dispersion Liquid (60)>
Fluorescent colorant A-containing particles (60): 200 parts
Surfactant (Neogen RK manufactured by DKS Co. Ltd.): 15 parts (solid content concentration 20%)
Pure water: 785 parts The above components are mixed and crushed to 0.2 µm with a continuous key mill KMC-3 to prepare a fluorescent colorant A-containing particle dispersion liquid (60) (solid content concentration 20%).

<Preparation of Colorant B-Containing Particles (60)>
Dried product of the styrene acrylic resin particle dispersion liquid (1) after removing impurities with a dialysis membrane: 47.5 parts
Blocked isocyanate (VESTAGON BF1358, manufactured by Evonik Industries): 47.5 parts
Magenta pigment (FASTOGEN SUPER MAGENTA R): 5 parts The above components are mixed by heating at 170° C. for 2 hours, roughly crushed with a Banbury mixer, and further crushed with a crusher AFG100 (manufactured by Hosokawa Micron Corporation) to 1.9 µm, to obtain polyester polyurethane resin colored particles (colorant B-containing particles (60)).

<Preparation of Colorant B-Containing Particle Dispersion Liquid (60)>
Colorant B-containing particles (60): 200 parts
Surfactant (Neogen RK manufactured by DKS Co. Ltd.): 15 parts (solid content concentration 20%)
Pure water: 785 parts The above components are mixed, and a colorant B-containing particle dispersion liquid (60) (solid content concentration 20%) is prepared by Ultra Turrax.

<Preparation of Toner Particles (60)>
Fluorescent colorant A-containing particle dispersion liquid (60): 421 parts
Colorant B-containing particle dispersion liquid (60): 4 parts
Release agent particle dispersion liquid (1): 25 parts
Anionic surfactant (Neogen RK manufactured by DKS Co. Ltd., 20%): 10 parts The above materials are charged into a round stainless steel flask, 0.1 N(=mol/L) nitric acid is added to adjust the pH to 3.5, and then 30 parts of a nitric acid aqueous solution having a polyaluminum chloride concentration of 10 mass % is added thereto. Next, the mixture is dispersed at a liquid temperature of 30° C. using a homogenizer (trade name: Ultra Turrax T50, manufactured by IKA Company), and then heated to 45° C. in a heating oil bath and kept for 30 minutes. Thereafter, 50 parts of the styrene acrylic resin particle dispersion liquid (1) is added and kept for 1 hour, a 0.1 N sodium hydroxide aqueous solution is added to adjust the pH to 8.5, and then the mixture is heated to 84° C. and kept for 2.5 hours. Then, the mixture is cooled to 20° C. at a rate of 20° C./min, the solid content is filtered off, thoroughly washed with ion-exchanged water, and dried to obtain toner particles (60). The volume average particle diameter of the toner particles (60) is 5.7 µm.

An electrostatic charge image developing toner and an electrostatic charge image developer are prepared in the same manner as in Example 1 except that the toner particles (60) are used instead of the toner particles (1).

Comparative Example 1: Uniform Dispersion

Dried product of the resin particle dispersion liquid (1) after removing impurities with a dialysis membrane: 48.7 parts
Polyester resin (Fine Dick M-8020 manufactured by DIC CORPORATION): 16 parts
Blocked isocyanate (VESTAGON BF1358, manufactured by Evonik Industries): 16 parts
Fluorescent dye (Basic Red 1:1, Rhodamine 6GCP-N manufactured by Taoka Chemical Co., Ltd.): 3.5 parts
Magenta pigment (FASTOGEN SUPER MAGENTA R): 0.8 part
Release agent (paraffin wax, HNP-9 manufactured by Nippon Seiro Co., Ltd.): 5 parts The above components are mixed by heating at 170° C. for 2 hours, roughly crushed with a Banbury mixer, and further crushed with a crusher AFG100 (manufactured by Hosokawa Micron Corporation), to obtain toner particles. The volume average particle diameter of the toner particles is 5.5 µm.

The above toner particles: 90 parts
Dried product of the resin particle dispersion liquid (1) after removing impurities with a dialysis membrane: 10 parts The above components are mixed with Nobilta 300 (manufactured by Hosokawa Micron Corporation) to obtain toner particles coated with a shell layer. The volume average particle diameter of the toner particles is 5.9 µm.

Comparative Example 2

An electrostatic charge image developing toner and an electrostatic charge image developer are prepared in the same manner as in Comparative Example 1 except that the magenta pigment is changed to PR202 (Cinquasia Magenta L 4530, manufactured by BASF) in Comparative Example 2.

Comparative Example 3

An electrostatic charge image developing toner and an electrostatic charge image developer are prepared in the same manner as in Comparative Example 1 except that the magenta pigment is changed to PR282 (Cinquasia Magenta L 4400, manufactured by BASF) in Comparative Example 3.

Comparative Example 4

An electrostatic charge image developing toner and an electrostatic charge image developer are prepared in the same manner as in Comparative Example 1 except that the magenta pigment is changed to a PR122/PV19 solid solution pigment (FASTOGEN SUPER MAGENTA RE-05, manufactured by DIC CORPORATION) in Comparative Example 4.

Comparative Example 5

An electrostatic charge image developing toner and an electrostatic charge image developer are prepared in the same manner as in Comparative Example 1 except that the magenta pigment is changed to PR238 (Permanent Carmine FSB, manufactured by Clariant Ltd.) in Comparative Example 5.

Comparative Example 6

An electrostatic charge image developing toner and an electrostatic charge image developer are prepared in the same manner as in Comparative Example 1 except that the magenta pigment is changed to PR269 (Pigment Red 269, manufactured by TOKYO SHIKIZAI INDUSTRY Co., Ltd.) in Comparative Example 6.

Comparative Example 7

An electrostatic charge image developing toner and an electrostatic charge image developer are prepared in the same manner as in Comparative Example 1 except that the magenta pigment is changed to PR169 (Fanal Pink D 4810, manufactured by BASF) in Comparative Example 7.

Comparative Example 8

An electrostatic charge image developing toner and an electrostatic charge image developer are prepared in the same manner as in Comparative Example 1 except that the magenta pigment is changed to PR81:2 (Fanal Pink D 4830, manufactured by BASF) in Comparative Example 8.

The following evaluations are performed using the obtained electrostatic charge image developing toners and the electrostatic charge image developers of Examples 1 to 60 and Comparative Examples 1 to 8. The evaluation results are summarized in Tables 1 to 7.

<Fluorescence Intensity Evaluation>

The following work and image formation are performed in an environment of a temperature of 23° C. and a humidity of 50% RH.

As an image forming apparatus for forming an evaluation image, ApeosPort IV C4470 manufactured by Fuji Xerox Co., Ltd. is prepared, a developer is charged into a developing device, and a replenishment toner (the same toner as the toner contained in the developer) is charged into a toner cartridge. Subsequently, a 5 cm×5 cm image with an image area ratio of 100% is formed on an OS-coated paper having a basis weight of 127 g/m$^2$ manufactured by Fuji Xerox Co., Ltd., and is output at a fixing temperature of 170° C. to evaluate the fluorescence intensity.

Regarding the fluorescence intensity, X-Rite (manufactured by X-Rite Inc.) is used to measure the spectral reflectance in the visible light region, and the fluorescence peak intensity in the spectral reflectance is taken as the fluorescence intensity.

A: 112% or more
B: 108% or more and less than 112%
C: 104% or more and less than 108%
D: less than 104%

TABLE 1

| | Fluorescent colorant A | | | Colorant B | | |
|---|---|---|---|---|---|---|
| | Type | Fluorescence peak wave length (nm) | Content (mass %) | Type | Content (mass %) | Type of binder resin |
| Example 1 | Basic Red 1:1 (Rhodamine 6GCP-N manufactured by Taoka Chemical Co., Ltd.) | 610 | 3.5 | PR122 (FASTOGEN SUPER MAGENTA R manufactured by DIC CORPORATION | 1.8 | Polyester resin + polyester polyurethane resin |
| Example 2 | Basic Red 1:1 (Rhodamine 6GCP-N manufactured by Taoka Chemical Co., Ltd.) | 610 | 3.5 | PR122 (FASTOGEN SUPER MAGENTA R manufactured by DIC CORPORATION) | 1.8 | Polyester resin + polyester polyurethane resin |
| Example 3 | Basic Red 1:1 (Rhodamine 6GCP-N manufactured by Taoka Chemical Co., Ltd.) | 610 | 3.5 | PR202 (Cinquasia Magenta L 4530 manufactured by BASF) | 1.8 | Polyester resin + polyester polyurethane resin |
| Example 4 | Basic Red 1:1 (Rhodamine 6GCP-N manufactured by Taoka Chemical Co., Ltd.) | 610 | 3.5 | PR202 (Cinquasia Magenta L 4530 manufactured by BASF) | 1.8 | Polyester resin + polyester polyurethane resin |
| Example 5 | Basic Red 1:1 (Rhodamine 6GCP-N manufactured by Taoka Chemical Co., Ltd.) | 610 | 3.5 | PR282 (Cinquasia Magenta L 4400 manufactured by BASF) | 1.8 | Polyester resin + polyester polyurethane resin |
| Example 6 | Basic Red 1:1 (Rhodamine 6GCP-N manufactured by Taoka Chemical Co., Ltd.) | 610 | 3.5 | PR282 (Cinquasia Magenta L 4400 manufactured by BASF) | 1.8 | Polyester resin + polyester polyurethane resin |

TABLE 1-continued

|   | | | | | | |
|---|---|---|---|---|---|---|
| Example 7 | Basic Red 1:1 (Rhodamine 6GCP-N manufactured by Taoka Chemical Co., Ltd.) | 610 | 3.5 | PR122/PV19 solid solution pigment (FASTOGEN SUPER MAGENTA RE-05 manufactured by DIC CORPORATION) | 1.8 | Polyester resin + polyester polyurethane resin |
| Example 8 | Basic Red 1:1 (Rhodamine 6GCP-N manufactured by Taoka Chemical Co., Ltd.) | 610 | 3.5 | PR122/PV19 solid solution pigment (FASTOGEN SUPER MAGENTA RE-05 manufactured by DIC CORPORATION) | 1.8 | Polyester resin + polyester polyurethane resin |
| Example 9 | Basic Red 1:1 (Rhodamine 6GCP-N manufactured by Taoka Chemical Co., Ltd.) | 610 | 3.5 | PR238 (Permanent Carmine F5B manufactured by Clariant Ltd.) | 1.8 | Polyester resin + polyester polyurethane resin |
| Example 10 | Basic Red 1:1 (Rhodamine 6GCP-N manufactured by Taoka Chemical Co., Ltd.) | 610 | 3.5 | PR238 (Permanent Carmine F5B manufactured by Clariant Ltd.) | 1.8 | Polyester resin + polyester polyurethane resin |

| | Case of sea-island structure | | | | | |
|---|---|---|---|---|---|---|
| | Structure of region A and region B in toner particles | Colorant contained in sea structure | Colorant contained in island structure | Volume average particle diameter VI (μm) of island structure | Volume average particle diameter VT (μm) of toner particles | VI/VT | Fluorescence intensity (%) |
| Example 1 | Sea-island structure | Colorant B | Fluorescent colorant A | 1.9 | 5.8 | 0.33 | 105 |
| Example 2 | Sea-island structure | Fluorescent colorant A | Colorant B | 1.8 | 5.8 | 0.31 | 109 |
| Example 3 | Sea-island structure | Colorant B | Fluorescent colorant A | 1.9 | 5.7 | 0.33 | 106 |
| Example 4 | Sea-island structure | Fluorescent colorant A | Colorant B | 1.9 | 5.7 | 0.33 | 109 |
| Example 5 | Sea-island structure | Colorant B | Fluorescent colorant A | 1.9 | 5.6 | 0.34 | 107 |
| Example 6 | Sea-island structure | Fluorescent colorant A | Colorant B | 1.8 | 5.8 | 0.31 | 109 |
| Example 7 | Sea-island structure | Colorant B | Fluorescent colorant A | 1.9 | 5.7 | 0.33 | 106 |
| Example 8 | Sea-island structure | Fluorescent colorant A | Colorant B | 1.8 | 5.9 | 0.31 | 108 |
| Example 9 | Sea-island structure | Colorant B | Fluorescent colorant A | 1.9 | 5.8 | 0.33 | 107 |
| Example 10 | Sea-island structure | Fluorescent colorant A | Colorant B | 1.9 | 5.9 | 0.32 | 109 |

TABLE 2

| | Fluorescent colorant A | | | Colorant B | | |
|---|---|---|---|---|---|---|
| | Type | Fluorescence peak wave length (nm) | Content (mass %) | Type | Content (mass %) | Type of binder resin |
| Example 11 | Basic Red 1:1 (Rhodamine 6GCP-N manufactured by Taoka Chemical Co., Ltd.) | 610 | 3.5 | PR269 (Pigment Red 269 manufactured by TOKYO SHIKIZAI INDUSTRY Co., Ltd.) | 1.8 | Polyester resin + polyester polyurethane resin |
| Example 12 | Basic Red 1:1 (Rhodamine 6GCP-N manufactured by Taoka Chemical Co., Ltd.) | 610 | 3.5 | PR269 (Pigment Red 269 manufactured by TOKYO SHIKIZAI INDUSTRY Co., Ltd.) | 1.8 | Polyester resin + polyester polyurethane resin |
| Example 13 | Basic Red 1:1 (Rhodamine 6GCP-N manufactured by Taoka Chemical Co., Ltd.) | 610 | 3.5 | PR169 (Fanal Pink D 4810 manufactured by BASF) | 1.8 | Polyester resin + polyester polyurethane resin |
| Example 14 | Basic Red 1:1 (Rhodamine 6GCP-N manufactured by Taoka Chemical Co., Ltd. | 610 | 3.5 | PR169 (Fanal Pink D 4810 manufactured by BASF) | 1.8 | Polyester resin + polyester polyurethane resin |
| Example 15 | Basic Red 1:1 (Rhodamine 6GCP-N manufactured by Taoka Chemical Co., Ltd.) | 610 | 3.5 | PR81:2 (Fanal Pink D 4830 manufactured by BASF) | 1.8 | Polyester resin + polyester polyurethane resin |
| Example 16 | Basic Red 1:1 (Rhodamine 6GCP-N manufactured by Taoka Chemical Co., Ltd.) | 610 | 3.5 | PR81:2 (Fanal Pink D 4830 manufactured by BASF) | 1.8 | Polyester resin + polyester polyurethane resin |

TABLE 2-continued

| | | | | | | |
|---|---|---|---|---|---|---|
| Example 17 | Basic Red 1:1 (Rhodamine 6GCP-N manufactured by Taoka Chemical Co., Ltd.) | 610 | 2.5 | PR122 (FASTOGEN SUPER MAGENTA R manufactured by DIC CORPORATION) | 1.8 | Polyester resin + polyester polyurethane resin |
| Example 18 | Basic Red 1:1 (Rhodamine 6GCP-N manufactured by Taoka Chemical Co., Ltd. | 610 | 2.5 | PR122 (FASTOGEN SUPER MAGENTA R manufactured by DIC CORPORATION) | 1.8 | Polyester resin + polyester polyurethane resin |
| Example 19 | Basic Red 1:1 (Rhodamine 6GCP-N manufactured by Taoka Chemical Co., Ltd.) | 610 | 1.5 | PR122 (FASTOGEN SUPER MAGENTA R manufactured by DIC CORPORATION | 1.8 | Polyester resin + polyester polyurethane resin |
| Example 20 | Basic Red 1:1 (Rhodamine 6GCP-N manufactured by Taoka Chemical Co., Ltd.) | 610 | 1.5 | PR122 (FASTOGEN SUPER MAGENTA R manufactured by DIC CORPORATION) | 1.8 | Polyester resin + polyester polyurethane resin |

| | | | Case of sea-island structure | | | | |
|---|---|---|---|---|---|---|---|
| | Structure of region A and region B in toner particles | Colorant contained in sea structure | Colorant contained in island structure | Volume average particle diameter VI (µm) of island structure | Volume average particle diameter VT (µm) of toner particles | VI/VT | Fluorescence intensity (%) |
| Example 11 | Sea-island structure | Colorant B | Fluorescent colorant A | 1.9 | 5.8 | 0.33 | 107 |
| Example 12 | Sea-island structure | Fluorescent colorant A | Colorant B | 1.9 | 5.8 | 0.33 | 109 |
| Example 13 | Sea-island structure | Colorant B | Fluorescent colorant A | 1.9 | 5.7 | 0.33 | 107 |
| Example 14 | Sea-island structure | Fluorescent colorant A | Colorant B | 1.8 | 5.9 | 0.31 | 110 |
| Example 15 | Sea-island structure | Colorant B | Fluorescent colorant A | 1.9 | 5.8 | 0.33 | 106 |
| Example 16 | Sea-island structure | Fluorescent colorant A | Colorant B | 1.8 | 5.7 | 0.32 | 109 |
| Example 17 | Sea-island structure | Colorant B | Fluorescent colorant A | 1.9 | 5.7 | 0.33 | 107 |
| Example 18 | Sea-island structure | Fluorescent colorant A | Colorant B | 1.7 | 5.8 | 0.29 | 110 |
| Example 19 | Sea-island structure | Colorant B | Fluorescent colorant A | 1.9 | 5.8 | 0.33 | 104 |
| Example 20 | Sea-island structure | Fluorescent colorant A | Colorant B | 1.8 | 5.9 | 0.31 | 109 |

TABLE 3

| | Fluorescent colorant A | | | Colorant B | | |
|---|---|---|---|---|---|---|
| | Type | Fluorescence peak wave length (nm) | Content (mass %) | Type | Content (mass %) | Type of binder resin |
| Example 21 | Basic Red 1:1 (Rhodamine 6GCP-N manufactured by Taoka Chemical Co., Ltd.) | 610 | 3.5 | PR122 (FASTOGEN SUPER MAGENTA R manufactured by DIC CORPORATION) | 1.3 | Polyester resin + polyester polyurethane resin |
| Example 22 | Basic Red 1:1 (Rhodamine 6GCP-N manufactured by Taoka Chemical Co., Ltd.) | 610 | 3.5 | PR122 (FASTOGEN SUPER MAGENTA R manufactured by DIC CORPORATION) | 1.3 | Polyester resin + polyester polyurethane resin |
| Example 23 | Basic Red 1:1 (Rhodamine 6GCP-N manufactured by Taoka Chemical Co., Ltd.) | 610 | 3.5 | PR122 (FASTOGEN SUPER MAGENTA R manufactured by DIC CORPORATION) | 0.8 | Polyester resin + polyester polyurethane resin |
| Example 24 | Basic Red 1:1 (Rhodamine 6GCP-N manufactured by Taoka Chemical Co., Ltd.) | 610 | 3.5 | PR122 (FASTOGEN SUPER MAGENTA R manufactured by DIC CORPORATION) | 0.8 | Polyester resin + polyester polyurethane resin |
| Example 25 | Basic Red 1:1 (Rhodamine 6GCP-N manufactured by Taoka Chemical Co., Ltd.) | 610 | 1.5 | PR122 (FASTOGEN SUPER MAGENTA R manufactured by DIC CORPORATION) | 0.8 | Polyester resin + polyester polyurethane resin |
| Example 26 | Basic Red 1:1 (Rhodamine 6GCP-N manufactured by Taoka Chemical Co., Ltd.) | 610 | 1.5 | PR122 (FASTOGEN SUPER MAGENTA R manufactured by DIC CORPORATION) | 0.8 | Polyester resin + polyester polyurethane resin |
| Example 27 | Basic Violet 11:1 (Rhodamine A manufactured by Taoka Chemical Co., Ltd.) | 620 | 1.5 | PR122 (FASTOGEN SUPER MAGENTA R manufactured by DIC CORPORATION) | 0.8 | Polyester resin + polyester polyurethane resin |

TABLE 3-continued

| | | | | | |
|---|---|---|---|---|---|
| Example 28 | Basic Violet 11:1 (Rhodamine A manufactured by Taoka Chemical Co., Ltd.) | 620 | 1.5 | PR122 (FASTOGEN SUPER MAGENTA R manufactured by DIC CORPORATION) | 0.8 | Polyester resin + polyester polyurethane resin |
| Example 29 | Basic Violet 11:1 (Rhodamine A manufactured by Taoka Chemical Co., Ltd.) | 620 | 1.5 | PR202 (Cinquasia Magenta L 4530 manufactured by BASF) | 0.8 | Polyester resin + polyester polyurethane resin |
| Example 30 | Basic Violet 11:1 (Rhodamine A manufactured by Taoka Chemical Co., Ltd.) | 620 | 1.5 | PR202 (Cinquasia Magenta L 4530 manufactured by BASF) | 0.8 | Polyester resin + polyester polyurethane resin |

| | Structure of region A and region B in toner particles | Colorant contained in sea structure | Colorant contained in island structure | Case of sea-island structure Volume average particle diameter VI (μm) of island structure | Volume average particle diameter VT (μm) of toner particles | VI/VT | Fluorescence intensity (%) |
|---|---|---|---|---|---|---|---|
| Example 21 | Sea-island structure | Colorant B | Fluorescent colorant A | 1.9 | 5.9 | 0.32 | 110 |
| Example 22 | Sea-island structure | Fluorescent colorant A | Colorant B | 1.8 | 5.8 | 0.31 | 113 |
| Example 23 | Sea-island structure | Colorant B | Fluorescent colorant A | 1.9 | 5.7 | 0.33 | 111 |
| Example 24 | Sea-island structure | Fluorescent colorant A | Colorant B | 1.9 | 5.8 | 0.33 | 114 |
| Example 25 | Sea-island structure | Colorant B | Fluorescent colorant A | 1.9 | 5.8 | 0.33 | 111 |
| Example 26 | Sea-island structure | Fluorescent colorant A | Colorant B | 1.8 | 5.7 | 0.32 | 115 |
| Example 27 | Sea-island structure | Colorant B | Fluorescent colorant A | 1.8 | 5.9 | 0.3 | 110 |
| Example 28 | Sea-island structure | Fluorescent colorant A | Colorant B | 1.9 | 5.7 | 0.3 | 113 |
| Example 29 | Sea-island structure | Colorant B | Fluorescent colorant A | 1.8 | 5.8 | 0.3 | 109 |
| Example 30 | Sea-island structure | Fluorescent colorant A | Colorant B | 1.9 | 5.9 | 0.3 | 114 |

TABLE 4

| | Fluorescent colorant A | | | Colorant B | | |
|---|---|---|---|---|---|---|
| | Type | Fluorescence peak wave length (nm) | Content (mass %) | Type | Content (mass %) | Type of binder resin |
| Example 31 | Basic Violet 11:1 (Rhodamine A manufactured by Taoka Chemical Co., Ltd.) | 620 | 1.5 | PR282 (Cinquasia Magenta L 4400 manufactured by BASF) | 0.8 | Polyester resin + polyester polyurethane resin |
| Example 32 | Basic Violet 11:1 (Rhodamine A manufactured by Taoka Chemical Co., Ltd.) | 620 | 1.5 | PR282 (Cinquasia Magenta L 4400 manufactured by BASF) | 0.8 | Polyester resin + polyester polyurethane resin |
| Example 33 | Basic Violet 11:1 (Rhodamine A manufactured by Taoka Chemical Co., Ltd.) | 620 | 1.5 | PR122/PV19 solid solution pigment (FASTOGEN SUPER MAGENTA RE-05 manufactured by DIC CORPORATION) | 0.8 | Polyester resin + polyester polyurethane resin |
| Example 34 | Basic Violet 11:1 (Rhodamine A manufactured by Taoka Chemical Co., Ltd.) | 620 | 1.5 | PR122/PV19 solid solution pigment (FASTOGEN SUPER MAGENTA RE-05 manufactured by DIC CORPORATION) | 0.8 | Polyester resin + polyester polyurethane resin |
| Example 35 | Basic Violet 11:1 (Rhodamine A manufactured by Taoka Chemical Co., Ltd.) | 620 | 1.5 | PR238 (Permanent Carmine F5B manufactured by Clariant Ltd.) | 0.8 | Polyester resin + polyester polyurethane resin |
| Example 36 | Basic Violet 11:1 (Rhodamine A manufactured by Taoka Chemical Co., Ltd.) | 620 | 1.5 | PR238 (Permanent Carmine F5B manufactured by Clariant Ltd. | 0.8 | Polyester resin + polyester polyurethane resin |
| Example 37 | Basic Violet 11:1 (Rhodamine A manufactured by Taoka Chemical Co., Ltd.) | 620 | 1.5 | PR269 (Pigment Red 269 manufactured by TOKYO SHIKIZAI INDUSTRY Co., Ltd.) | 0.8 | Polyester resin + polyester polyurethane resin |

TABLE 4-continued

| | | | | | | |
|---|---|---|---|---|---|---|
| Example 38 | Basic Violet 11:1 (Rhodamine A manufactured by Taoka Chemical Co., Ltd.) | 620 | 1.5 | PR269 (Pigment Red 269 manufactured by TOKYO SHIKIZAI INDUSTRY Co., Ltd.) | 0.8 | Polyester resin + polyester polyurethane resin |
| Example 39 | Basic Violet 11:1 (Rhodamine A manufactured by Taoka Chemical Co., Ltd.) | 620 | 1.5 | PR169 (Fanal Pink D 4810 manufactured by BASF) | 0.8 | Polyester resin + polyester polyurethane resin |
| Example 40 | Basic Violet 11:1 (Rhodamine A manufactured by Taoka Chemical Co., Ltd.) | 620 | 1.5 | PR169 (Fanal Pink D 4810 manufactured by BASF) | 0.8 | Polyester resin + polyester polyurethane resin |

| | | | Case of sea-island structure | | | | |
|---|---|---|---|---|---|---|---|
| | Structure of region A and region B in toner particles | Colorant contained in sea structure | Colorant contained in island structure | Volume average particle diameter VI (μm) of island structure | Volume average particle diameter VT (μm) of toner particles | VI/VT | Fluorescence intensity (%) |
| Example 31 | Sea-island structure | Colorant B | Fluorescent colorant A | 1.8 | 5.8 | 0.3 | 110 |
| Example 32 | Sea-island structure | Fluorescent colorant A | Colorant B | 1.7 | 5.8 | 0.3 | 113 |
| Example 33 | Sea-island structure | Colorant B | Fluorescent colorant A | 1.8 | 5.7 | 0.3 | 108 |
| Example 34 | Sea-island structure | Fluorescent colorant A | Colorant B | 1.9 | 5.9 | 0.3 | 112 |
| Example 35 | Sea-island structure | Colorant B | Fluorescent colorant A | 1.8 | 5.8 | 0.3 | 110 |
| Example 36 | Sea-island structure | Fluorescent colorant A | Colorant B | 1.9 | 5.7 | 0.3 | 113 |
| Example 37 | Sea-island structure | Colorant B | Fluorescent colorant A | 1.8 | 5.7 | 0.3 | 109 |
| Example 38 | Sea-island structure | Fluorescent colorant A | Colorant B | 1.8 | 5.8 | 0.3 | 114 |
| Example 39 | Sea-island structure | Colorant B | Fluorescent colorant A | 1.8 | 5.7 | 0.3 | 110 |
| Example 40 | Sea-island structure | Fluorescent colorant A | Colorant B | 1.7 | 5.8 | 0.3 | 115 |

TABLE 5

| | Fluorescent colorant A | | | Colorant B | | |
|---|---|---|---|---|---|---|
| | Type | Fluorescence peak wave length (nm) | Content (mass %) | Type | Content (mass %) | Type of binder resin |
| Example 41 | Basic Violet 11:1 (Rhodamine A manufactured by Taoka Chemical Co., Ltd.) | 620 | 1.5 | PR81:2 (Fanal Pink D 4830 manufactured by BASF) | 0.8 | Polyester resin + polyester polyurethane resin |
| Example 42 | Basic Violet 11:1 (Rhodamine A manufactured by Taoka Chemical Co., Ltd.) | 620 | 1.5 | PR81:2 (Fanal Pink D 4830 manufactured by BASF) | 0.8 | Polyester resin + polyester polyurethane resin |
| Example 43 | Basic Red 1 (Rhodamine 6GCP manufactured by Taoka Chemical Co., Ltd.) | 610 | 1.5 | PR122/PV19 solid solution pigment (FASTOGEN SUPER MAGENTA RE-05 manufactured by DIC CORPORATION) | 0.8 | Polyester resin + polyester polyurethane resin |
| Example 44 | Basic Red 1 (Rhodamine 6GCP manufactured by Taoka Chemical Co., Ltd.) | 610 | 1.5 | PR122/PV19 solid solution pigment (FASTOGEN SUPER MAGENTA RE-05 manufactured by DIC CORPORATION) | 0.8 | Polyester resin + polyester polyurethane resin |
| Example 45 | Basic Violet 10 (Rhodamine B gran. manufactured by Taoka Chemical Co., Ltd.) | 630 | 1.5 | PR122/PV19 solid solution pigment (FASTOGEN SUPER MAGENTA RE-05 manufactured by DIC CORPORATION) | 0.8 | Polyester resin + polyester polyurethane resin |
| Example 46 | Basic Violet 10 (Rhodamine B gran. manufactured by Taoka Chemical Co., Ltd.) | 630 | 1.5 | PR122/PV19 solid solution pigment (FASTOGEN SUPER MAGENTA RE-05 manufactured by DIC CORPORATION) | 0.8 | Polyester resin + polyester polyurethane resin |
| Example 47 | Solvent Red 49 (Rhodamine B base manufactured by Taoka Chemical Co., Ltd.) | 630 | 1.5 | PR122/PV19 solid solution pigment (FASTOGEN SUPER MAGENTA RE-05 manufactured by DIC CORPORATION) | 0.8 | Polyester resin + polyester polyurethane resin |
| Example 48 | Solvent Red 49 (Rhodamine B base manufactured by Taoka Chemical Co., Ltd.) | 630 | 1.5 | PR122/PV19 solid solution pigment (FASTOGEN SUPER MAGENTA RE-05 manufactured by DIC CORPORATION) | 0.8 | Polyester resin + polyester polyurethane resin |

TABLE 5-continued

| | | | | | | |
|---|---|---|---|---|---|---|
| Example 49 | Basic Yellow 40 (Neeliglow Yellow 40 manufactured by Neelikon Food Dyes And Chemicals) | 580 | 1.5 | PY74 (HANSA BRILLIANT YELLOW 2GX 70 manufactured by Clariant Ltd.) | 0.8 | Polyester resin + polyester polyurethane resin |
| Example 50 | Basic Yellow 40 (Neeliglow Yellow 40 manufactured by Neelikon Food Dyes And Chemicals) | 580 | 1.5 | PY74 (HANSA BRILLIANT YELLOW 2GX 70 manufactured by Clariant Ltd.) | 0.8 | Polyester resin + polyester polyurethane resin |

| | Case of sea-island structure | | | | | | |
|---|---|---|---|---|---|---|---|
| | Structure of region A and region B in toner particles | Colorant contained in sea structure | Colorant contained in island structure | Volume average particle diameter VI (μm) of island structure | Volume average particle diameter VT (μm) of toner particles | VI/VT | Fluorescence intensity (%) |
| Example 41 | Sea-island structure | Colorant B | Fluorescent colorant A | 1.8 | 5.9 | 0.3 | 111 |
| Example 42 | Sea-island structure | Fluorescent colorant A | Colorant B | 1.9 | 5.8 | 0.3 | 115 |
| Example 43 | Sea-island structure | Colorant B | Fluorescent colorant A | 1.9 | 5.8 | 0.3 | 109 |
| Example 44 | Sea-island structure | Fluorescent colorant A | Colorant B | 1.8 | 5.7 | 0.3 | 112 |
| Example 45 | Sea-island structure | Colorant B | Fluorescent colorant A | 1.8 | 5.7 | 0.3 | 111 |
| Example 46 | Sea-island structure | Fluorescent colorant A | Colorant B | 1.9 | 5.8 | 0.3 | 114 |
| Example 47 | Sea-island structure | Colorant B | Fluorescent colorant A | 1.7 | 5.9 | 0.3 | 110 |
| Example 48 | Sea-island structure | Fluorescent colorant A | Colorant B | 1.8 | 5.8 | 0.3 | 113 |
| Example 49 | Sea-island structure | Colorant B | Fluorescent colorant A | 1.8 | 5.7 | 0.3 | 108 |
| Example 50 | Sea-island structure | Fluorescent colorant A | Colorant B | 1.9 | 5.8 | 0.3 | 113 |

TABLE 6

| | Fluorescent colorant A | | | Colorant B | | |
|---|---|---|---|---|---|---|
| | Type | Fluorescence peak wave length (nm) | Content (mass %) | Type | Content (mass %) | Type of binder resin |
| Example 51 | Solvent Green 7 (Needlink Green 7 manufactured by Neelikon Food Dyes And Chemicals) | 520 | 1.5 | PG36 (FASTOGEN GREEN 2YK manufactured by DIC CORPORATION) | 0.8 | Polyester resin + polyester polyurethane resin |
| Example 52 | Solvent Green 7 (Needlink Green 7 manufactured by Neelikon Food Dyes And Chemicals) | 520 | 1.5 | PG36 (FASTOGEN GREEN 2YK manufactured by DIC CORPORATION) | 0.8 | Polyester resin + polyester polyurethane resin |
| Example 53 | Solvent Orange 63 (Neelglow Orange 63 manufactured by Neelikon Food Dyes And Chemicals) | 600 | 1.5 | PO43 (Hostaperm Orange GR manufactured by Clariant Ltd.) | 0.8 | Polyester resin + polyester polyurethane resin |
| Example 54 | Solvent Orange 63 (Neelglow Orange 63 manufactured by Neelikon Food Dyes And Chemicals) | 600 | 1.5 | PO43 (Hostaperm Orange GR manufactured by Clariant Ltd.) | 0.8 | Polyester resin + polyester polyurethane resin |
| Example 55 | Basic Red 1:1 (Rhodamine 6GCP-N manufactured by Taoka Chemical Co., Ltd.) | 610 | 1.5 | PR122 (FASTOGEN SUPER MAGENTA R manufactured by DIC CORPORATION) | 0.8 | Polyester resin + polyester polyurethane resin |
| Example 56 | Basic Red 1:1 (Rhodamine 6GCP-N manufactured by Taoka Chemical Co., Ltd.) | 610 | 1.5 | PR122 (FASTOGEN SUPER MAGENTA R manufactured by DIC CORPORATION) | 0.8 | Polyester resin + polyester polyurethane resin |
| Example 57 | Basic Red 1:1 (Rhodamine 6GCP-N manufactured by Taoka Chemical Co., Ltd.) | 610 | 1.5 | PR122 (FASTOGEN SUPER MAGENTA R manufactured by DIC CORPORATION) | 0.8 | Polyester resin + polyester polyurethane resin |

TABLE 6-continued

| | | | | | | |
|---|---|---|---|---|---|---|
| Example 58 | Basic Red 1:1 (Rhodamine 6GCP-N manufactured by Taoka Chemical Co., Ltd.) | 610 | 1.5 | PR122 (FASTOGEN SUPER MAGENTA R manufactured by DIC CORPORATION) | 0.8 | Polyester resin + polyester polyurethane resin |
| Example 59 | Basic Red 1:1 (Rhodamine 6GCP-N manufactured by Taoka Chemical Co., Ltd.) | 610 | 1.5 | PR122 (FASTOGEN SUPER MAGENTA R manufactured by DIC CORPORATION) | 0.8 | Polyester resin + polyester polyurethane resin |
| Example 60 | Basic Red 1:1 (Rhodamine 6GCP-N manufactured by Taoka Chemical Co., Ltd.) | 610 | 1.5 | PR122 (FASTOGEN SUPER MAGENTA R manufactured by DIC CORPORATION) | 0.8 | Polyester resin + polyester polyurethane resin |

| | Case of sea-island structure | | | | | |
|---|---|---|---|---|---|---|
| | Structure of region A and region B in toner particles | Colorant contained in sea structure | Colorant contained in island structure | Volume average particle diameter VI (μm) of island structure | Volume average particle diameter VT (μm) of toner particles | VI/VT | Fluorescence intensity (%) |
| Example 51 | Sea-island structure | Colorant B | Fluorescent colorant A | 1.8 | 5.9 | 0.3 | 109 |
| Example 52 | Sea-island structure | Fluorescent colorant A | Colorant B | 1.9 | 5.8 | 0.3 | 112 |
| Example 53 | Sea-island structure | Colorant B | Fluorescent colorant A | 1.8 | 5.7 | 0.3 | 109 |
| Example 54 | Sea-island structure | Fluorescent colorant A | Colorant B | 1.8 | 5.8 | 0.3 | 114 |
| Example 55 | Sea-island structure | Colorant B | Fluorescent colorant A | 1.4 | 5.9 | 0.24 | 110 |
| Example 56 | Sea-island structure | Fluorescent colorant A | Colorant B | 1.4 | 5.9 | 0.24 | 115 |
| Example 57 | Sea-island structure | Colorant B | Fluorescent colorant A | 2.5 | 5.7 | 0.44 | 111 |
| Example 58 | Sea-island structure | Fluorescent colorant A | Colorant B | 2.5 | 5.7 | 0.44 | 116 |
| Example 59 | Sea-island structure | Colorant B | Fluorescent colorant A | 1.8 | 5.8 | 0.3 | 109 |
| Example 60 | Sea-island structure | Fluorescent colorant A | Colorant B | 1.9 | 5.7 | 0.3 | 116 |

TABLE 7

| | Fluorescent colorant A | | | Colorant B | | |
|---|---|---|---|---|---|---|
| | Type | Fluorescence peak wave length (nm) | Content (mass %) | Type | Content (mass %) | Type of binder resin |
| Comparative Example 1 | Basic Red 1:1 (Rhodamine 6GCP-N manufactured by Taoka Chemical Co., Ltd.) | 610 | 3.5 | PR122 (FASTOGEN SUPER MAGENTA R manufactured by DIC CORPORATION) | 1.8 | Polyester resin + polyester polyurethane resin |
| Comparative Example 2 | Basic Red 1:1 (Rhodamine 6GCP-N manufactured by Taoka Chemical Co., Ltd.) | 610 | 3.5 | PR202 (Cinquasia Magenta L 4530 manufactured by BASF) | 1.8 | Polyester resin + polyester polyurethane resin |
| Comparative Example 3 | Basic Red 1:1 (Rhodamine 6GCP-N manufactured by Taoka Chemical Co., Ltd.) | 610 | 3.5 | PR282 (Cinquasia Magenta L 4400 manufactured by BASF) | 1.8 | Polyester resin + polyester polyurethane resir |
| Comparative Example 4 | Basic Red 1:1 (Rhodamine 6GCP-N manufactured by Taoka Chemical Co., Ltd.) | 610 | 3.5 | PR122/PV19 solid solution pigment (FASTOGEN SUPER MAGENTA RE-05 manufactured by DIC CORPORATION) | 1.8 | Polyester resin + polyester polyurethane resin |
| Comparative Example 5 | Basic Red 1:1 (Rhodamine 6GCP-N manufactured by Taoka Chemical Co., Ltd.) | 610 | 3.5 | PR238 (Permanent Carmine F5B manufactured by Clariant Ltd.) | 1.8 | Polyester resin + polyester polyurethane resin |
| Comparative Example 6 | Basic Red 1:1 (Rhodamine 6GCP-N manufactured by Taoka Chemical Co., Ltd.) | 610 | 3.5 | PR269 (Pigment Red 269 manufactured by TOKYO SHIKIZAI INDUSTRY Co., Ltd.) | 1.8 | Polyester resin + polyester polyurethane resin |

TABLE 7-continued

| | | | | | | |
|---|---|---|---|---|---|---|
| Comparative Example 7 | Basic Red 1:1 (Rhodamine 6GCP-N manufactured by Taoka Chemical Co., Ltd.) | 610 | 3.5 | PR169 (Fanal Pink D 4810 manufactured by BASF) | 1.8 | Polyester resin + polyester polyurethane resin |
| Comparative Example 8 | Basic Red 1:1 (Rhodamine 6GCP-N manufactured by Taoka Chemical Co., Ltd.) | 610 | 3.5 | PR81:2 (Fanal Pink D 4830 manufactured by BASF) | 1.8 | Polyester resin + polyester polyurethane resin |

| | Case of sea-island structure | | | | | | |
|---|---|---|---|---|---|---|---|
| | Structure of region A and region B in toner particles | Colorant contained in sea structure | Colorant contained in island structure | Volume average particle diameter VI (μm) of island structure | Volume average particle diameter VT (μm) of toner particles | VI/VT | Fluorescence intensity (%) |
| Comparative Example 1 | Uniform | — | — | — | 5.9 | — | 103 |
| Comparative Example 2 | Uniform | — | — | — | 5.9 | — | 102 |
| Comparative Example 3 | Uniform | — | — | — | 5.8 | — | 103 |
| Comparative Example 4 | Uniform | — | — | — | 5.7 | — | 101 |
| Comparative Example 5 | Uniform | — | — | — | 5.8 | — | 99 |
| Comparative Example 6 | Uniform | — | — | — | 5.9 | — | 100 |
| Comparative Example 7 | Uniform | — | — | — | 5.9 | — | 101 |
| Comparative Example 8 | Uniform | — | — | — | 5.8 | — | 103 |

From the results shown in Tables 1 to 7, it is seen that the resin particles (electrostatic charge image developing toners) of Examples have a fluorescence intensity of the obtained image higher than that of the resin particles (electrostatic charge image developing toners) of Comparative Examples.

Example 61

—Preparation of Coated Product—

A 10 cm×10 cm square test panel of a zinc phosphate-treated steel plate are coated with the resin particles of Example 1 by a corona gun manufactured by Asahi Sunac Corporation, at a distance of 30 cm from the front surface by sliding the corona gun vertically and horizontally so as to form a coating film having a thickness of 30 μm or more and 50 μm or less, and then the coating film is baked under baking conditions of 150° C. for 5 minutes, so as to prepare a coated product.

It is confirmed that the prepared coated product is coated with the powder adhered to the product to be coated (zinc phosphate-treated steel plate).

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments are chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A resin particle comprising:
   a binder resin comprising:
      a first binder resin comprising polyurethane; and
      a second binder resin that is different than the first binder resin, the second binder resin comprising a styrene-acrylic copolymer or a polyester resin;
   a fluorescent colorant A; and
   a colorant B other than the fluorescent colorant A,
   wherein:
   the resin particle includes a sea-island structure comprising:
      a region RA that forms an island structure in which a content of the fluorescent colorant A is larger than a content of the colorant B, wherein the region RA includes the first binder resin; and
      a region RB that forms a sea structure in which a content of the colorant B is larger than a content of the fluorescent colorant A, wherein the region RB includes the second binder resin, and
   a ratio VI/VT of a volume average particle diameter VI of the island structure in the sea-island structure to a volume average particle diameter VT of the resin particle is 0.15 or more and 0.80 or less.

2. The resin particle according to claim 1,
   wherein the ratio VI/VT of the volume average particle diameter VI of the island structure in the sea-island structure to the volume average particle diameter VT of the resin particle is 0.30 or more and 0.65 or less.

3. The resin particle according to claim 1,
   wherein the fluorescent colorant A is a fluorescent dye.

4. The resin particle according to claim 3,
   wherein the fluorescent dye contains a fluorescent dye having a maximum fluorescence wavelength in a wavelength range of 580 nm to 650 nm.

5. The resin particle according to claim 1, wherein the colorant B contains a magenta pigment.

6. The resin particle according to claim 5, wherein the colorant B contains two or more magenta pigments.

7. The resin particle according to claim 1, wherein the content of the fluorescent colorant A in the region RA is 80 mass % or more based on a total mass of all colorants contained in the region RA.

8. The resin particle according to claim 1, wherein the content of the fluorescent colorant A in the region RA is 90 mass % or more based on a total mass of all colorants contained in the region RA.

9. The resin particle according to claim 1, wherein the fluorescent colorant A is the only colorant contained in the region RA.

10. The resin particle according to claim 1, wherein the content of the colorant B in the region RB is 80 mass % or more based on a total mass of all colorants contained in the region RB.

11. The resin particle according to claim 1, wherein the content of the colorant B in the region RB is 90 mass % or more based on a total mass of all colorants contained in the region RB.

12. The resin particle according to claim 1, wherein the colorant B is the only colorant contained in the region RB.

13. The resin particle according to claim 1, wherein:

the content of the fluorescent colorant A in the region RA is 80 mass % or more based on a total mass of all colorants contained in the region RA, and the content of the colorant B in the region RB is 80 mass % or more based on a total mass of all colorants contained in the region RB.

* * * * *